INVENTOR.
Jerome H. Lemelson

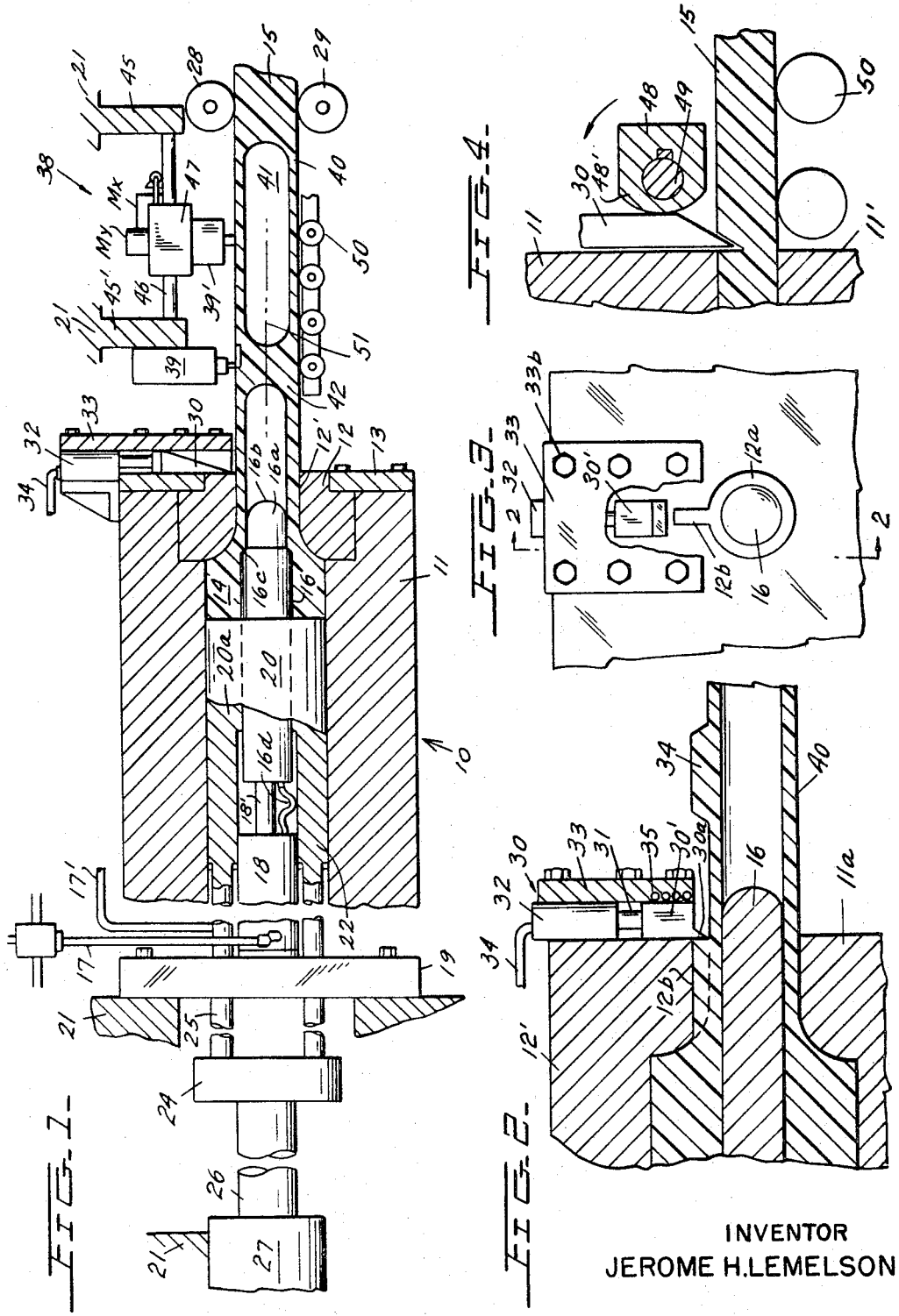

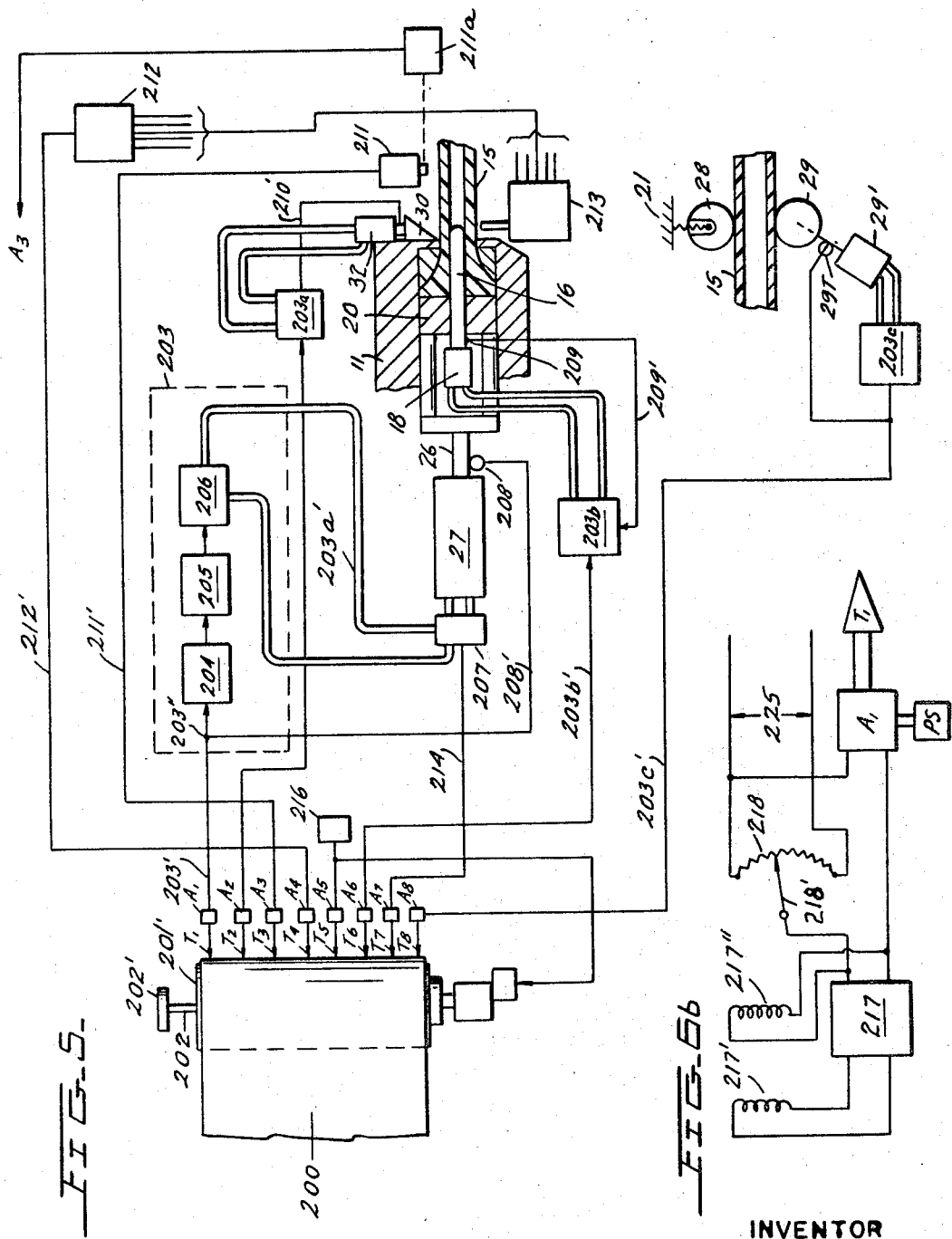

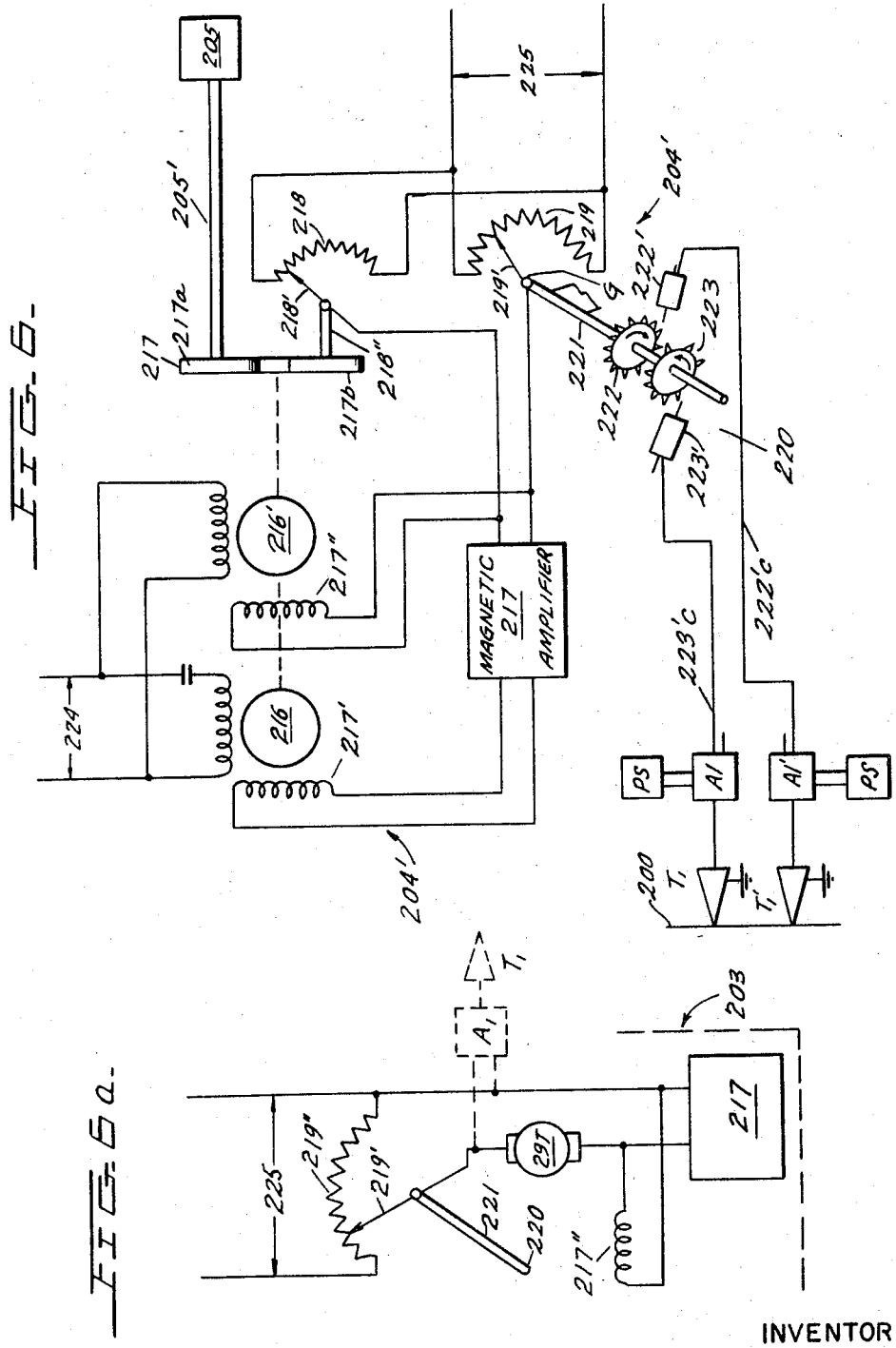

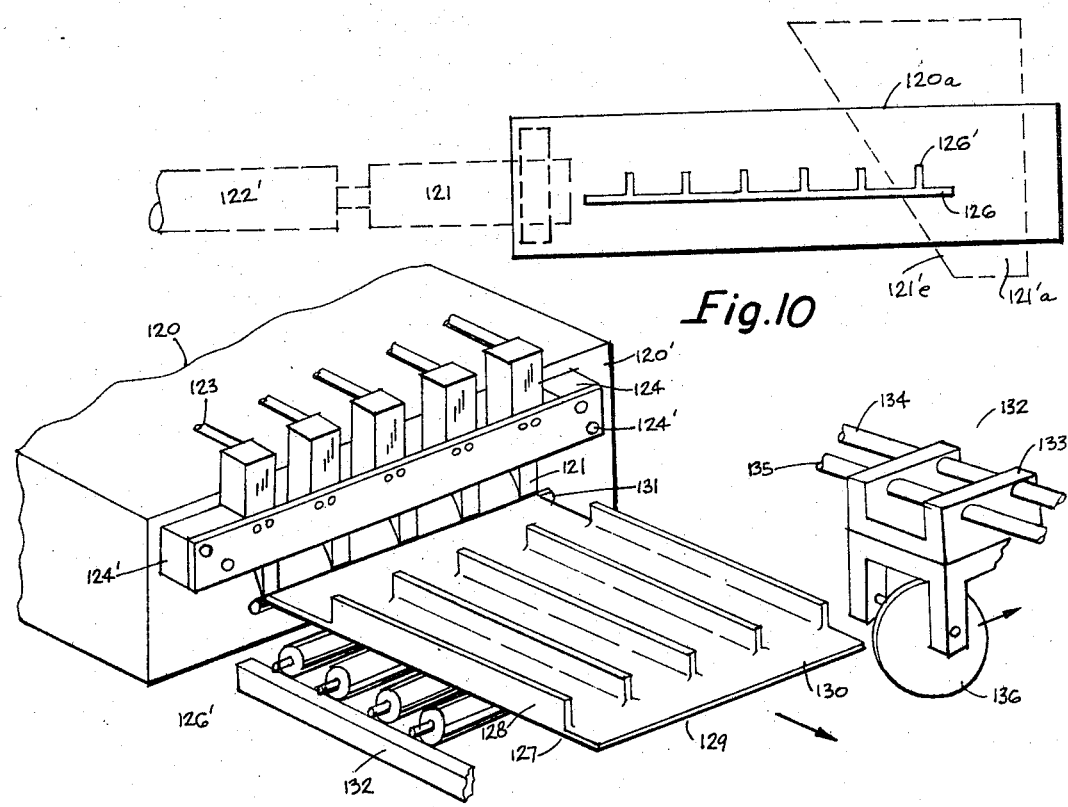
Fig. 10
Fig. 9
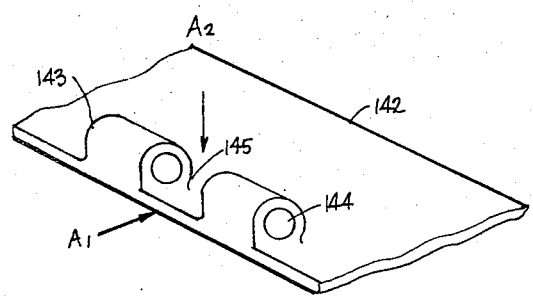
Fig. 17
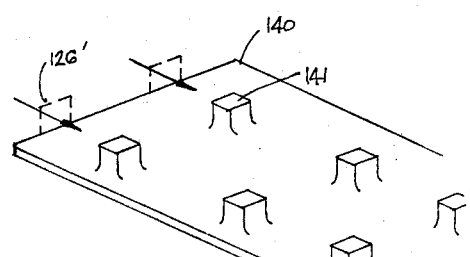
Fig. 15
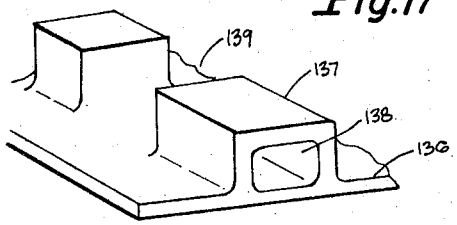
Fig. 16
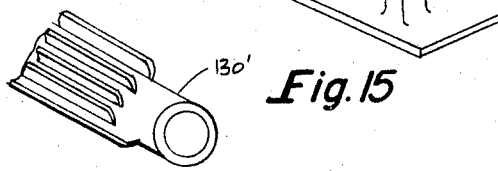
Fig. 18
INVENTOR.
Jerome H. Lemelson

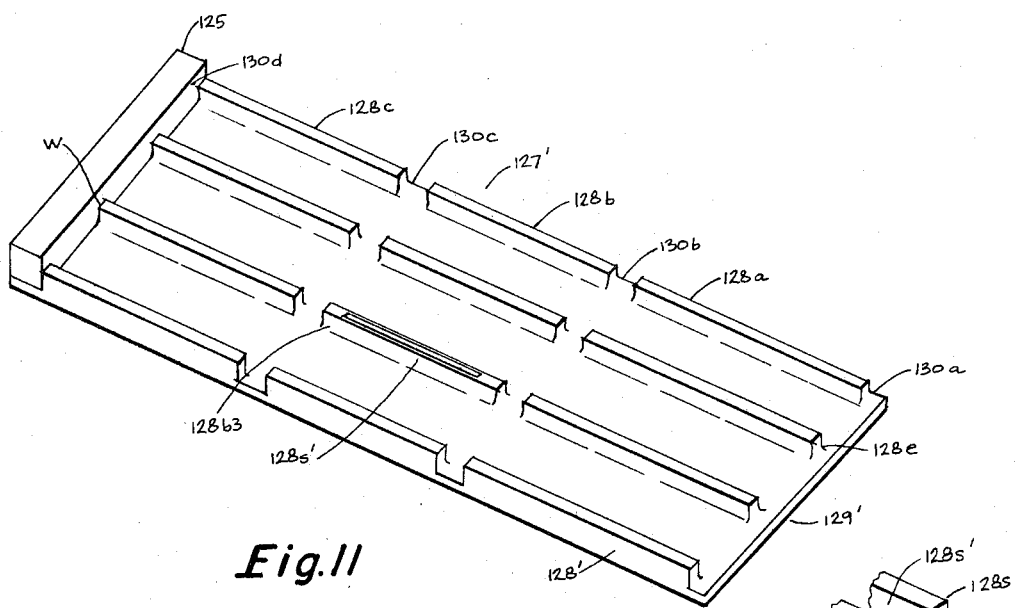
Fig. 11
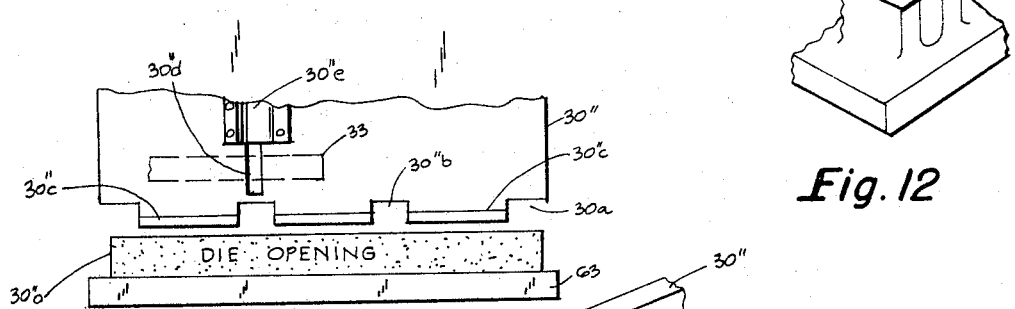
Fig. 12
Fig. 13
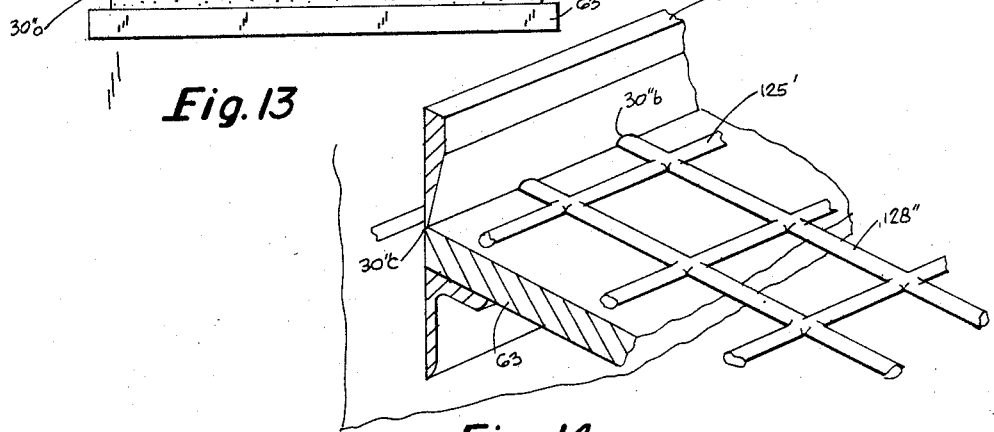
Fig. 14

INVENTOR.
Jerome H. Lemelson

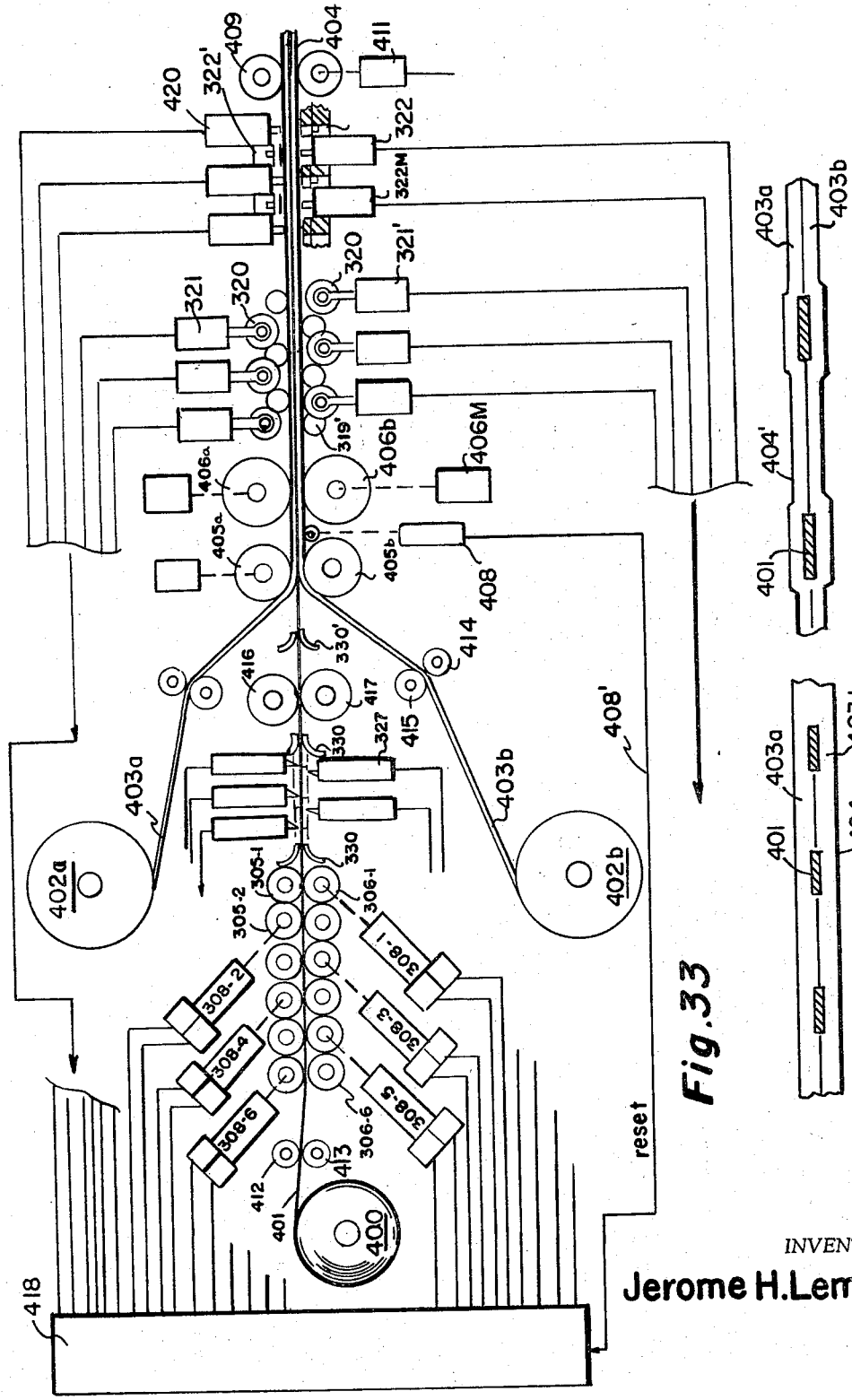

United States Patent Office 3,422,648
Patented Jan. 21, 1969

3,422,648
EXTRUSION APPARATUS
Jerome H. Lemelson, 85 Rector St.,
Metuchen, N.J. 08840
Filed Oct. 2, 1961, Ser. No. 142,405
U.S. Cl. 72—8
Int. Cl. B21c 23/04, 23/28, 3/06

19 Claims

ABSTRACT OF THE DISCLOSURE

Extrusion apparatus is provided for operating on an extrusion or elongated preformed member so as to variably change its shape along the length thereof. In one form, tooling is provided which is automatically controlled to advance against predetermined portions of an extrusion or elongated member and to operate thereon to predeterminately change the shape of said portions. In another form, apparatus is provided for variably covering a preformed member with extrusion material by varying the flow of extrusion material to the surface of the preformed member. The apparatus includes tooling mounted externally of the extruder and, in certain instances, tooling provided within the extruder or the throat of the extrusion die which composite tooling may operate separately or in coaction with each other.

The invention is also concerned with automatic control means for predeterminately controlling operations on preshaped elongated members or extrusions as and immediately after they are formed so as to automatically vary and predetermine the shape thereof.

---

This invention relates to apparatus and methods for automatically shaping and fabricating elongated articles of irregular shape and is a continuation-in-part of my copending application Ser. No. 691,622 for Extrusion Apparatus and Automatic Control Thereof, which was filed on Oct. 22, 1957, now Patent No. 3,002,615.

Various structural members fabricated by extrusion such as tubes, angles, beams, rods and the like require a considerable amount of reworking and machining in order to fabricate them into components of finished products. For example, in addition to performing the necessary operations of cutting a tubular member from a standard length of tubing to a required length and finishing the ends of the cut tube by deburring, bevelling or spinning means, it may be required to further shape, cut, slot, bend, drill, bore, reduce or increase part of said tube in inside and/or outside diameter, fasten or weld brackets or other members to said tube, thread or provide fittings or closures on an end or ends thereof, and perform additional operations before the tube is ready for assembly with other members to form a finished product. These operations not only require the expenditure of considerable time, labor and the employment of special machines, fixtures and additional machinery but result in the production of a considerable amount of scrap material.

This invention relates to an improved extrusion apparatus and elongated articles produced thereby which are automatically post-formed, machined, marked or otherwise finished by one or more of a plurality of tools which are synchronously operated in relation to each other and the feed of said elongated articles. By varying the extrusion area, an elongated member such as a tube, beam plate, rod or other structural shape may be provided having one or more integrally formed projections extending from said member at predetermined points along its length. Slots in its walls or changes in internal cross-section may also be provided at predetermined lengths of said extrusion which shape variations may eliminate one or more postforming or machining operations. A programmed automatic control system is provided for rapidly altering the sequencing as well as the degree of operation of the stop-extrusion means so that a product may be produced conforming to a particular order. As a result the set-up or sequential control means may be easily varied with minimum downtime required to produce another product thereafter conforming to other requirements.

Accordingly, it is a primary object of this invention to provide improved automatic machinery for forming elongated materials such as metals and plastics in a manner whereby one or most postforming operations are eliminated.

Another object is to provide new and improved extrusion machinery for extruding material to shape which varies in cross-section with length.

Another object of this invention is to provide improved apparatus having means for automatically varying the shape of elongated sheet, rod or tubular material as it is formed.

Another object is to provide improved means for simultaneously controlling the extrusion rate and the operation of various tools for changing the shape or cross-section of an extrusion as it extrudes from a die.

Another object is to provide new and improved means for automatically shaping tubing and other elongated shapes to predetermined configurations without the need for manual positioning or human control.

Another object is to provide automatic apparatus for producing improved and complex elongated shapes whereby said shapes may be varied in cross-section or configuration along different sections of its length without the need for complex set-up operations and with little downtime.

Another object is to provide apparatus for automatically extruding materials to shapes of varying cross-section whereby additional material may be provided along the length of an extrusion where it is needed such as at support or fastening positions, thereby permitting extrusions to be made with less material and without sacrificing strength.

Another object is to provide an improved means for supporting an extruding member while it is being formed or changed in shape as it expresses from a die.

Another object is to provide an improved means for extruding and simultaneously working on such materials as thermoplastic plastics and metals.

Another object is to provide an improved extrusion apparatus for providing an extrusion material of varying thickness on a preshaped article such as a rod, wire or tube.

Another object is to provide an improved extrusion apparatus for producing coaxial electrical cable and an improved coaxial electrical cable produced therefrom.

Still another object is to provide an improved apparatus for producing an electrical harness from extruded materials.

Another object is to provide an improved extrusion apparatus in which a multiple conductor flat electrical harness may be automatically fabricated.

Another object is to provide an improved extrusion apparatus for fabricating improved articles of metal and plastic.

Another object is to provide an apparatus as described including an improved arrangement for feeding elongated strip conductors and the like by means of a plurality of oscillating pins or shafts.

Another object is to provide a tool for changing the external cross-section of an extrusion as it extrudes which tool includes means for sealingly retaining said tool against a die.

Another object is to provide an improved extrusion apparatus for extruding hollow tubing including an improved extrusion mandrel which may be used to provide a plurality of functions.

Another object is to provide a new type of extruded sheet material having longitudinal positions of said sheet which vary in cross-section from other longitudinal portions.

Another object is to provide a new and improved extruded sheet which may be used as a component of a hollow closed panel requiring only two components.

Another object is to provide an improved apparatus and method for extruding a hollow plastic panel having extruded internal reinforcing portions which do not extend the length of the panel with insulating voids therebetween.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention, as claimed.

FIG. 1 is partly sectioned, partial side view of an extruding machine made in accordance with the teachings and also illustrating an extruded shape and means for forming said shape.

FIG. 2 is a fragmentary view in vertical cross-section of a tubing extrusion press having means for varying the external shape of said tubing;

FIG. 3 is an end view of FIG. 2 with parts broken away for clarity;

FIG. 4 is a partial view of the apparatus of FIG. 2 modified with means for supporting the means for varying the external shape of the tubing;

FIG. 5 is a schematic and block diagram of an automatic control system and apparatus of this invention controlled thereby, and FIG. 6 shows a modified control diagram for apparatus of this invention employing a hydraulically operated servo and is applicable to FIG. 5.

FIG. 6a shows a modified form of control applicable to replace certain components in FIG. 6 and FIG. 6b shows details of automatic control means applicable to the apparatus of FIG. 5.

FIG. 9 is an isometric view showing an extrusion apparatus for extruding a ribbed sheet in which a plurality of ribs are provided along only predetermined lengths of the extrusion and also illustrating a movable cutting saw;

FIG. 10 is an end view of the extrusion die of FIG. 9 showing variations in the stop-extrusion tools;

FIG. 11 is an isometric view showing a portion of an extrusion producible by means of a modified form of the apparatus of FIG. 9;

FIG. 12 is an isometric view of a fragment of a portion of a plate or sheet producible by apparatus similar to that illustrated in FIG. 9;

FIG. 13 illustrates modification in the apparatus of FIG. 9 requisite for producing an extrusion illustrated in part in FIG. 12;

FIG. 14 is a partial isometric view of a modified extrusion die for producing a lattice-like structure such as the illustrated grid or sheet material reinforced with an integral grid or ribbed formation having longitudinal and lateral rib-like protrusions;

FIG. 15 is an isometric view of an extrusion in the form of a sheet having a plurality of bosses or the like integrally extruded and projecting from a surface thereof;

FIG. 16 is an isometric view of a fragment of a sheet or plate showing a hollow boss produced and integrally extruded on a surface of the plate by apparatus as described;

FIG. 17 is an isometric view of a fragment of a plate showing tubular formations integrally extruded on a surface thereof;

FIG. 18 is an isometric view of a fragment of a finned tubular member producible by a modification to the apparatus of FIG. 1;

FIG. 33 is a schematic diagram of an apparatus for producing an electrical cable or harness of the type illustrated in FIG. 29 which may or may not utilize extrusion means for providing an isulating material to encapsulate a plurality of electrical conductors;

FIG. 34 is an end elevational view of the composite article producible by means of the apparatus of FIG. 33;

FIG. 35 is an end elevational view of a modified composite article producible in the apparatus of FIG. 33.

Figure 7:
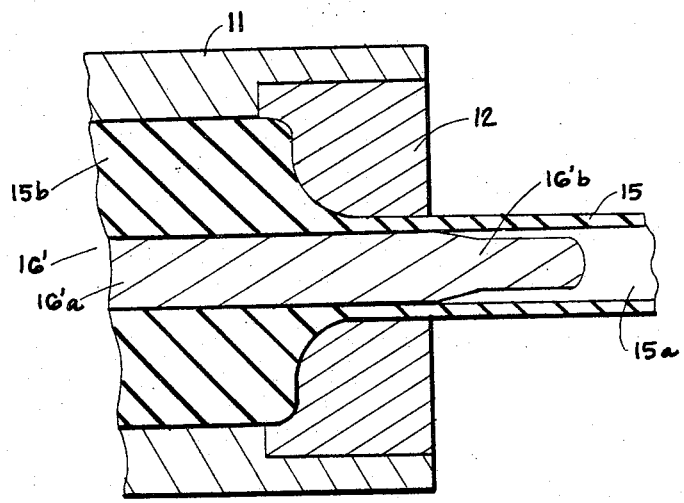
FIG. 7 is an elevational view in cross-section showing an extrusion die and a modified type of extrusion mandrel which is stepped to provide variations in the wall thickness of an extruded member.

In application Ser. No. 691,622, is described an apparatus for effecting the type of result hereinabove described, which apparatus employs one or more movable devices which will hereafter be referred to a "stop-extrusion tools" for causing variations in the cross-section of an extrusion as it extrudes by changing the cross-sectional area of the extrusion die. A typical apparatus, and control system therefore, although not necessarily limited thereto, for carrying out automatic variations in the shape of an extrusion is illustrated herein in FIGS. 1 to 6. Part of said apparatus and its control system, it is noted, may be applied to the automatic fabrication of pre-formed elongated structural members which are provided by extrusion or other means, as elongated rigid members requiring further shaping, fabricating and finishing. Although FIGS. 1 to 6 deal with my earlier invention, a brief discussion thereof is helpful in understanding the invention of the present application.

FIG. 1 shows in partial cross-section details of an extrusion apparatus including an extrusion press 10 having a die section comprising a die chamber member 11 with a die 12 secured at one end of the chamber 14 and held by an end plate 13. The expressing of flowable material such as aluminum or plastic through the extruder is effected while said material is heated below its molten state or while in a cold state by conventional pressure expressing means. In the apparatus of FIG. 1, a piston 20 travels longitudinally in the chamber 14 by the action of one or more hydraulic cylinders 27 one of which is shown with its ram 26 connected to the rear section 22 of piston 20 through two or more rods 25 and a yoke plate 24. The rods 25 travel axially in bearings in a base plate 19 secured to the frame 21 of the press. Said frame 21 also supports the piston prime moving cylinder 27. A mandrel 16 for forming the inside wall of the tubing is axially movable in a base 20a in the head end of the piston and is urged in reciprocating motion therein, so that its far end travels in and out of the bore of die block 12, by the ram 18' of a second hydraulic cylinder 18 secured to the bearing plate 19. Thus, as the piston 20 forces material out the opening in die 12 by movement towards said die, the smaller piston or mandrel 16 may be oscillated in the opening in said die at predetermined points in the extrusion cycle a predetermined degree in a range of longitudinal positions from one in which only a solid rod section having the diameter of the die hole will be extruded, to a position whereby a tube is shaped having a wall with an inside diameter equal to the outside diameter of the mandrel in the opening in the die. Depending on the shape of the end of the mandrel over which the expressed material flows and the degree and manner in which said mandrel is manipulated, tubing having a wall shape which varies in cross-section with length in a predetermined manner may be derived by automatic control of the mandrel's longitudinal motion and by controlling the speed of the ram of the hydraulic cylinder 18 by varying the pressure at the inlet and exhaust lines 17 and 17' to the cylinder of 18. The operation may be effected automatically and variations in the position of the tools and speed of operation of the servo which effects extrusion rate may be controlled to occur at predetermined times during the extrusion cycle to provide a tube or any elongated structural shape of predetermined cross-section change.

As an example, the cylindrical extruding member 15 is shown with one or more solid sections 42 provided at predetermined positions along the lengths of the tubular member. Manipulation of the mandrel 16 so that it projects far enough into the opening in the die 12 through which the material is expressing, will provide a shape which is equivalent in cross-section to the annular volume defined by the diametrical surface of mandrel 16a and the wall of the die opening. As the mandrel nose 16a is retracted by the action of cylinder 18 and moves backward into the chamber 14, since the nose 16a tapers or reduces in cross-section, the annular extrusion area through which material is permitted to extrude will increase and eventually a solid cross-section such as 42 will be formed in the extrusion which may extend for a predetermined length of the member 15 depending on the time the mandrel remains retracted during the extrusion process. Depending on the shape of the mandrel nose 16a and the degree said mandrel is moved in and out of the die opening, a variety of different internal cross-sections may be provided including sections having internal shelves, flanges, or plug-like formations such as 42 with or without enclosed or restricted openings such as 41 extending longitudinally therethrough. Automatic control of the degree of motion or position of the ram of cylinder 18 as well as the timing of such action may be effected by means of an automatic controller which may also be adapted to control the operation of cylinder 27 and the speed and degree of travel of piston 20. Other apparatus may also be controlled by the same controller for further finishing the extrusion and effecting a mark thereon or cutting off or otherwise shaping said extrusion. If the control means is properly timed and sequenced relative to the start of the extrusion cycle, a structural member or tube may be produced having internal changes in cross-section, such as the solid plug-like closure sections 42 at predetermined points in its length. If the locations of sections 42 of the member 15 are maintained and known, and it is later desired to perform further shaping operations at said sections, or to effect bends on the thinner wall sections 40 therebetween, said operations may be performed in another machine which is set up and sequenced to perform said operations using an end of a section of the member 15 as a reference point or bench mark. This assumes that the cut-off point of the extrusion 15 or the position at which a predetermined point in the extrusion begins or ends is known.

FIG. 1 also illustrates other apparatus which may be employed for further finishing operations on the member 15 as it is extruded. The notation 39 refers to a solenoid or fluid cylinder operated marking tool which may be controlled by said sequential or a feedback control means such as that controlling the extrusion and mandrel operating cylinders to effect a mark or small indentation in the outer surface of the member 15 at each of the solid cross-section sections 42 to indicate their positions for indicating where to perform operations such as drilling, bending, cutting, etc. The notation 50 refers to a roller conveyor or the like for supporting the member 15 as it extrudes and preventing its deformation due to the forces applied by tool 30. The tool 39 may also be a drill or punching tool for partly or completely penetrating and providing a hole or cavity in the sections 42 or the thin walled sections 40 between said solid plug sections. While 39 is shown secured to part of the frame or mount 21 for the press, it may also be mounted on a carriage such as 47 which is movable when actuated in the direction of extrusion and is adapted to move at the same rate as the member 15 to serve as a so-called flying mount for the tool 39 so that said tool may perform an operation of 15 while fixed relative to said extruding member.

The notation 32 refers to a hydraulic cylinder mounted on the end of the die chamber 11 which is adapted to project a blade or tool 30 against 15 to reduce the cross-section thereof. The tool or blade 30 may also pertain to a shear for cutting of the member 15 into predetermined lengths and is preferably under the control of the means for automatically controlling the other servos. The numerals 28 and 29 refer to a pair of rollers, one of which is power operated, which may be utilized for further guiding and driving the member 15 away from the chamber 11 after cutoff.

Cutoff may also be effected by stepping the mandrel in shape as at 16c. When 16c is moved into the constant diameter section of the die opening 12', it acts as the plunger of a valve and is shaped to reduce the annular extrusion area when projected to or near zero clearance so that said extrusion is stopped or the wall 40 is made so thin that simple means may be employed to part the member 15.

In order to effect the formation of the solid plug section 42 without reducing the speed at which the member 15 is extruding, it will be necessary to increase the rate of travel of the piston 20 so that the extrusion material rate of flow will increase during the period it is shaped into section 42. An increase in the rate of travel of said piston may also be required, depending on the characteristics of the material being extruded, to prevent buckling of the thin wall 40 as 16 is withdrawn. The changes in speed of travel of piston 20 may be effected automatically by means of a predetermining controller which also controls all the servos employed.

The apparatus of FIG. 1 may be utilized for producing, in addition to structural members having predetermined cross-sectional variations therein which are utilized for reenforcing said members along predetermined lengths thereof or for securing fittings or other structural members thereto. Various other types of extrusions may also be produced by means of the apparatus of FIG. 1 when modified for injecting a fluid and retaining it within a hollow extrusion. The enclosed volumes 41 of FIG. 1 which are provided between solid plug-like portions of the extrusion referred to by the notation 42 may be formed for retaining and encapsulating various solids, liquids or gasses within the extrusion. As such the tube 15 may be used as a container having multiple separate chambers such as 41 separated by solid restricted sections 42. The material held in 41 may be automatically fed through a duct in the center of mandrel 16 having a valved opening 16b in the end of mandrel nose 16a for admitting said fluid which is controlled by a valve (not shown) operated by a servo controlled by the programming means controlling the other servos of the apparatus. The liquid material may be ejected from 16b just prior to or as mandrel 16 is withdrawn from the die opening 12'. The notation 16d refers to a flexible fluid carrying tube extending to the extrusion chamber and communicating with a bore extending and terminating at 16b for conducting the fluid thereto. The extruding material making up the member 15 may be solder, and the material ejected from 16b may be a flux or paste the confined volumes 47 of which will be protected from drying up as a result of being so confined.

The material ejected through the nose of the mandrel 16 may be any liquid, powder or the like desired to be encapsulated in the tubular member and may comprise such materials as self foaming plastics, lubricants, detergents, food concentrates, molten plastics, chemicals or the like which may be dispensed by cutting or puncturing or rupturing the wall of the particular closed off section.

FIG. 1 also illustrates further apparatus referred to by the general notation 38 for performing one or more machining, forming or punching operations on the extruding member 15 on the fly or at the same rate of travel as the extruding member. Whereas the tool 39 may comprise such cutting means as a powered end-milling machine for shaping a portion of the surface of 15 or cutting a slot or flat therein by virtue of the rotation of its cutter as 15 is driven by the action of piston 20 with or without the added thrust and guidance of the powered rollers 28 and 29, the tool 39' of the fixture 38 is driven at the speed of extrusion of the formed member 15 and may perform any operation on 15 requiring zero relative speed with the tool.

Thus the tool of 39' may be a drill, end mill, saw or other shaping or cutting device and is mounted on a carriage 47 which is adapted to be power driven along a track 46 supported in bearing by sections 45 and 45' of the frame 21 of the press 10 or otherwise fixed relative to said extruder. A motor MX which may be a fluid or electrical servo mounted on 47 or on the frame 21 is adapted to drive 47 along track or guide means 46. The servo MY projects the tool 39' against 15 which is rotated or otherwise operated by a motor mounted in 39' or 47. Motor MX is preferably under the control of an automatic speed controller as is MY. Sequential control of MX, MY and the motor driving the tool of 39' may be effected by a multi-circuit cycle circuit timer which starts and stops said motors in a predetermined sequence and direction by conventional sequential switching means upon receipt of a command signal from the means controlling the rest of the extrusion apparatus in a manner to be described and includes control switching means for automatically returning the carriage 47 to a starting position closer to the extruder at the end of each machining cycle. The device 39' may also contain motor driven means for causing the tool thereof to travel across 15 as it cuts or otherwise performs on said work and travel thereof may be controlled by limit switches in addition to sequential switching control.

If a plastic or material other than metal is utilized as the expressing material, the conventional screw conveyor extrusion means may be employed in place of the piston 20 and the rate of flow of the expressing material may be controlled by controlling the rate of rotation of the screw.

FIGS 2 and 3 show the extrusion apparatus of FIG. 1 modified with means for varying the external shape of tubing or structural member extruded therefrom. The apparatus will produce tubing having one or more shelves or flanges of predetermined length projecting at predetermined sections along said extrusion which may be used for strengthening or stiffening said tubing, to effect improved and simplified fastening of said extrusion to other members and for other functions.

In FIGS. 2 and 3 the die 12' is shown as having a through and through hole of irregular shape comprising a section 12a which is circular in cross-section and a radially extending opening portion 12b in the shape of a slot for the formation of an elongated extrusion with a ridge or shelf 34 projecting from the section extruded through 12a. A stop-gate 30 is mounted adjacent the end of die 12' which comprises a tool 30' of hardened metal with a bevelled nose 30a adapted to slidably engage the face 11a of the die block and to be urged by a ram 31 of a hydraulic cylinder 32 to cover and uncover the end of the projecting section 12b of the hole in the die 12'. Thus, if tool 30' is moved radially across and away from opening 12b as material is extruded through said die, one or more of the formations 34 may be provided projecting from the surface of the extrusion 15. The length and position of a formation 34 will be a function of the time during which extrusion tool 30' is positioned over the section 12b of the die hole and the amount of time it remains covering said section. The numeral 33 refers to a support for the tool 30' between which and the face 11a of the die block said tool is slidably engaged. Support 33 is preferably bolted to the die block 11 as is the cylinder 32. A lineal ball bearing 35 may be secured to the block 33 to bear against the tool blade 30' to reduce friction and facilitate movement of the tool across and radially away from the opening 12b.

FIG. 4 shows apparatus for urging one or more stop extrusion blades 30' in forced engagement against the face of the die or extruder housing in which said blade is supported against deflection. The mechanism of FIG. 4 may be used where the material being extruded has a tendency to flow between the face of the die, or extruder, and the blade, when the latter is advanced over all or part of the opening, thus resulting in an undesirable material leak which may affect the shape of the extrusion. In FIG. 4, the blade 30' is first driven against the extruding material stopping off part of the flow, as shown, to change the shape of the extrusion. A cam 48 mounted on a shaft 49 is then rotated by the action of a servo (not shown) which causes a surface 48' of the cam to engage the outer surface of the blade 30' and urge or force said blade against the face 11' o fthe die or extruder front wall, thereby effecting a seal between said blade and 11'. When 48 is again rotated clockwise, it disengages 30' allowing the latter to be withdrawn from the die opening. The operation of the servo advancing and retracting the blade may be interlocked with and synchronized to occur prior to and after the respective locking and unlocking actions of the cam 48. The shaft 49 of cam 48 is preferably supported by bearings secured to the extruder 11 or the frame 21 therefor so that its position remains fixed relative to the face of 11.

FIG. 5 illustrates programming and automatic control means for controlling the apparatus of FIGS. 1 to 4. The automatic control means illustrated in FIG. 5 is also applicable to the control of machining, fabricating and finishing operations on any elongated rigid structural member which is capable of being conveyed and prepositioned relative to a pluraliy of power operated tools and finishing devices. In the diagram as well as in the others illustrated which employ electrical control means, it is assumed that, where not illustrated, the proper power supplies are provided on the correct sides of all switches, controls, amplifiers, etc. Where illustrated, the notation PS refers to a power supply.

Specifications for the length and position of cross-sectional changes of the elongated member or extrusion such as holes, cutouts, slots or indentations formed by auxiliary tools such as drills, punches, dies, saws, milling cutters, etc. may vary from one production run or order to the next, hence means are provided in FIG. 5 for rapidly and easily changing the programmed and/or sequential control means for controlling the degree and direction of movement of the various tools as well as the speed and direction of motion of the extrusion varying means. Other servo means which may be desirably synchronized or interlocked to the movement of the extrusion or power driven structural member 15 include a servo means 32 for advancing and retracting the extrusion varying tool 30, which servo is controlled in speed and position, a servo means for operaing a cut-off tool for severing predetermined lengths of the extrusion 15 from the material expressing from the die, a servo means for operating a marking tool 39 for marking, decorating or indicating the positions of variations in internal shape by providing indentations or marks on the outside of the extrusion. It may also be required to control the speed of the powered rollers used for drawings or conveying the extrusion away from the extruder before and/or after severance of a length thereof from the expressing material. A sequential control such as a multi-circuit timer operative in response to a signal reproduced from a programmer 200 may also be provided for controlling auxiliary apparatus such as a valve or valves for effecting the flow of a fluid through the mandrel to provide a fluid in the chamber or chambers 41 for encapsulation of said fluid therein, and/or other auxiliary machining equipment such as described operations on the extruding or extruded section.

In FIG. 5, automatic sequential control of the various servo components of an automatic extrusion system utilizing one or more of the described devices for varying or operating on a section of material as it expresses from an extrusion machine, is effected by reproducing and utilizing signals recorded in a predetermined order on the surface of a magnetic drum or tape 200 or other recorder moving at constant velocity or intermittently moved past multiple reproduction transducer heads T1 to T7. A constant speed controlled motor 201 drives the shaft 202 of a pulley or a drum 201' driving a closed loop magnetic tape 200, which tape has command signals recorded on respective tracks thereof to effect a predetermined sequence of actions. While the complete tape transport is not shown, means are preferably provided for rapidly changing the closed loop tape 200 or erasing the signals recorded thereon and recording new signals so that the sequence and type of operations performed on predetermined lengths of the member 15 extruded from the extrusion press 11 may be rapidly altered with negligible downtime required to effect said change.

In FIG. 5, control of the lineal servo devices 18 and 27 which respectively control the degree of movement and speed of the mandrel 16 and the extrusion piston 20, is effected by means of an electro-hydraulic pump servo system. Illustrated, although not necessarily limited thereto, is a two-way variable displacement hydraulic pump used in a closed loop system with an electro-hydraulic stroker which varies pump delivery rate in proportion to a low level electrical input signal. Such a pump and control system therefore, is described in the April 1957 issue of Control Engineering Magazine.

In FIG. 5, one or more analog signals of varying amplitude are recorded on respective channels of the magnetic tape 200 and are each reproducible to provide a time variable voltage which is used to control an electric stroker 204 which in turn controls the position of a slide block of a variable displacement hydraulic pump 206 through a hydraulic stroker 205. The block notation 203 refers to the combination of the electric stroker 204, input thereto, hydraulic stroker 205, and hydraulic pump 206 and the other reference notations for blocks 203a, 203b, 203c, etc., are assumed to contain components similar to those provided in 203 for controlling other servos or hydraulic cylinders as described. The characteristics of the variable displacement hydraulic pump 206 are such that, depending on the position of the slide block thereof, which is controlled by the electro-hydraulic cylinder controlled thereby will be a function of the amplitude of the analog signal recorded on the channel of 200 controlling said servo or the voltage input to the electric stroker.

The feed-back loop of the system 203, which controls the position and direction of motion of the ram 26 of cylinder 27 and hence the motion of the extrusion piston 20, includes a potentiometer 208 having a wiper arm which is coupled, via gears or the like, to the movement of ram shaft 26. Hence, the value of the resistance of 208 is a function of the position of 26 and the piston 20. The command signal voltage is reproduced by pickup transducer T1 reproducing the analog signal from 200, which is amplified by linear amplifier A1 and is fed as a proportional voltage signal to the input 203" of controller 203. The notation 203" may represent a device such as a voltage comparator of known design, which is adapted to provide an error signal or a summing amplifier, the inputs of which are connected to receive the variable voltage signals from 208 and A1. The output of the summing amplifier 203" is used to control the electric stroker 204. Said output or error signal voltage is used to power the motor of the electric stroker 204 until the output of the feed-back potentiometer 208 equals the voltage output of A1. The electric stroker motor in turn controls a valve plunger through precision gearing and hence effects control of the hydraulic stroker 205. Thus, depending on the characteristics or rate of change of amplitude of the signal recorded on the channel of 200 from which T1 is reproducing, the piston 20 may not only be controlled in position but its speed and rate of change of speed may be controlled and varied according to the described requirements for increasing or decreasing the flow of material through the die as the mandrel 16 is moved relative thereto and gates different flows therethrough to change the internal cross-section of the extrusion. In a similar manner, the hydraulic cylinders 18 and 32 controlling the mandrel piston 16 and stop blade 30 may be controlled by means of the control systems 203a and 203b, each of which receives a variable voltage input over the circuits 203a' and 203b' which connect to respective amplifiers in the outputs of respective reproduction transducers which reproduce respective control signals from respective channels of tape 200. If multiple stop-extrusion blades are provided in a side by side array, for controlling width or formations on a wide extrusion, then each may be controlled by separate units 203a if positional control of said blades is desired, or merely by valving fluid to either side of the piston controlling the blade if the only control required is to advance the blade and retract it at predetermined positions in the cycle. Such control may be effected by the use of monostable solenoid valves for gating fluid under pressure from a reservoir to pump to either side of the piston of the cylinder 32 for controlling the projection or retraction of said blade. The solenoid valve or valves, which may occupy the positions of 203a or 203b of FIG. 5, may be controlled to switch from a position whereby the stop tool is retracted to an advanced or projecting position such that the shape of the extruding member is changed when a signal of the required amplitude is reproduced from the respective track of 200 and this signal is used as an actuating voltage for energizing the solenoid field coil. The lack of a signal at a monostable solenoid will cause it to retract thus switching the valve to the other position and reversing the flow of the pressurized fluid to the cylinder controlled thereby, whereby to cause the piston ram to return to its other position.

FIG. 5 also illustrates a control means in which pulse actuated switches or solenoids are employed to effect such actions as stamping, cutting, filling, and the like on the elongated extrusion as it moves or during periods while it is stopped after a predetermined degree of travel. The line 209' refers to a circuit including a feed-back potentiometer 209 similar to 208 which operates off the shaft of mandrel 16. Potentiometer 209 provides a voltage indicative of the position of actuator being controlled such as the mandrel 16 in the extrusion chamber or die or any of the hereinabove described devices operating on member 15. Said potentiometer 209 is connected to a comparator in 203b for providing an error signal by comparison of the feed-back signal generated by 209 with the command voltage transmitted from amplifier A6 over line 203b'. The error signal is used to control the operation of the respective actuator or piston 20. The line 210' functions in a similar manner and connects a feed-back potentiometer measuring the stroke or position of the blade 30 with an input to a comparator in 203a. Pulse signals reproduced by the pick-up head T3 are amplified and transmitted over circuit 211' to momentarily energize a solenoid for operating the marking or forming tool 211' which advances against the moving member 15 at predetermined intervals in a fabricating cycle and may be used to drill, externally shape, mark or otherwise indicate, where specific changes in internal cross-section occur along the extrusion.

The device referred to by notation 211 may also comprise any lineally actuated device for operating on and withdrawing from tool, clamp, punch, milling cutter or forming tool which may also be actuated to operate on the member 15 after it has been temporarily stopped as the result of the generation of the proper command voltage which results in the movement of the slide block of the variable displacement pump to a center or neutral position whereby no material is delivered to either of the ports of cylinder 27.

The notation 21 pertains to a sequentially controlled device for operating on the member 15 while it is in motion. The tool 213 may comprise, for example, such devices as a flying bed press, flying shear or flying saw mounted whereby it may be advanced against the extrusion, move a brief distance therewith as it extrudes at the speed of extrusion while operating thereon after which it automatically retracts and returns to a starting position from which it is thereafter again actuated in response to signals reproduced from recording member 200. The motors for powering the member 213 for operating on the work and for advancing it against the work and moving it at constant speed with the work, may be controlled by a feedback-comparator or by a multi-circuit timer 212 which is self-resetting and is initially energized by a pulse input thereto generated on input line 212' after its reproduction from the tape 200 in the manner described utilizing electro-hydraulic servos and feedback signal generating means as described.

It is noted that the control system illustrated in FIG. 5 provides a unique type of positional and tool control applicable for automatically operating on any elongated workpiece extruding or preshaped by other means, in response to a programmed sequence of control signals. Structural members such as tubes, beams, angles, channels, rods and the like may be automatically machined, formed or otherwise changed in shape along different portions of their length by cyclically reproducing a plurality of signals from a programmed such as the illustrated magnetic recording belt, record cards recording discs or the like, certain of which signals are employed to predetermine the position and/or speed of the workpiece during all intervals of a cycle by comparison with feedback signals generated with motion of the workpiece while other signals are employed to operate one or more tools which, because of the speed and positional control effected by said other reproduced signals and feedback signals effect predetermined changes in shape in predetermined portions of the workpiece.

Also shown in FIG. 5 is a means for effecting control of speed of the powered roller 29 of FIG. 1 for guiding and driving the extrusion 15, or a segment cut therefrom away from the press 11. A controller 203c, having similar components to those of 203, is provided for controlling the speed of a motor 29' which drives roller 29 in coacting with one or more depressor rolls 28 to effect movement of the extrusion. A closed loop speed control system is provided in which the output speed of motor 29' is measured by a feedback tachometer 29T driven by the shaft of 29' which follows the speed command voltage resulting from the amplification of a signal reproduced by a transducer T8 from a channel tape 200 which signal is of such a nature and that the speed of said drive rolls will vary in proportion to the rate of travel of the extruding member. The means for effecting control and variation of the speed of the drive rolls comprises the reproduction of a recorded speed command signal by T8 which is utilized for effecting speed control.

The reference numeral 211a' refers to a linear servo such as a solenoid or solenoid actuated ram operated by a signal from a respective transducer for urging the camlock 48 of FIG. 4 against the stop blade 30 to effect its sealing engagement with the die as described. If 211a is a servo such as a monostable solenoid, the presence of a signal reproduced from 200 at its input will cause cam 48 to bear against 30 whereas the cessation of generation of said signal will cause 48 to retract from 30.

FIG. 6 shows schematic apparatus for controlling the hydraulic servo devices heretofore described by means of signals reproduced from a tape which serve to program a cycle of actions while controlling said servos. An electrical stroker 204' is operated by pulse signals reproduced from recording tape 200. The electrical stroker 204' includes a command potentiometer 219 and a feedback potentiometer 218, the resistance elements of which are connected across a power supply line 225. The wiper arm 218' of feed-back pot 218 is rotated by a shaft 218" which is geared to the rotation of the shaft 205' of the hydraulic force stroker 205 which is driven by the shaft of the electric stroker motor 216. A tachometer 216', coupled to the shaft of motor 216, is used for stabilization. The notation 224 refers to a source of reference voltage across the stator coils of motor 216 and tachometer 216'. The error signal or difference between the value of the command potentiometer 219 and feed-back potentiometer, is fed to a magnetic amplifier 217 which amplifies and applies a control voltage to the coil 217' of motor 216. The wiper 219' of the command potentiometer is positioned by the shaft 221 of a servo device 220 to give the pot 219 a value in accordance with the characteristics of the signals recorded on the tape 200. The servo 220 comprises a pair of ratchet and pawl mechanisms 222 and 223 each adapted to effect rotation of said shaft a degree or unit angle in a respective direction when their respective solenoids 222' is energized by a pulse reproduced by a transducer T1' from a first channel of the tape 200, the plunger of said solenoid actuates the ratchet pawl mechanism 222 rotating shaft 221 a unit of rotation cbounterclockwise thereby rotating wiper arm 219' a unit angle clockwise through gears G. When solenoid 223' is energized by a pulse reproduced from another channel of 200 by head T1, the shaft 221 and hence 219' rotates in the opposite direction.

Control is thus effected by recording groups or trains of pulses along predetermined sections of each recording track of 200 and using these to effect a predetermined movement or prepositioning of one or more of said hydraulic servos. The length of each pulse train (i.e. the number of pulses in the train), will determine the degree of movement of the servo. The position of the pulse train, relative to the other recorded signals, will determine the timing or sequencing of the particular action, in the extrusion cycle. Control of the speed of movement of the servo may also be effected by the spacing of the pulses in the particular train. The closer the spacing of pulses, the faster shaft 221 will be stepped by the respective solenoid. The electric stroker will thus position the hydraulic stroker more rapidly and the pump will attain its command speed more rapidly. Thus, the servo operated thereby will move to or seek its commanded position more rapidly. By providing a pulse train in which each pulse is spaced from the next at an increasing or decreasing distance in the direction they are reproduced from 200, the rate of change of velocity or acceleration of the tool may be varied. Thus, depending on the response of the motor of the electric stroker in nulling the error signal, any predetermined position, speed, velocity or acceleration of the servo and tool may be attained by controlling the number, position and spacing of the pulses recorded on the magnetic recording member 200. It is noted that a punched tape and conventional finger limit switch or photocell reading means may also be employed in place of the magnetic tape or drum 200.

As the pump 206 may also be utilized to control the action of a rotary hydraulic servo or fluid motor, such servos may be used and controlled by the pulse control system described, to operate and control devices for operating on the extruding member. Control of the speed or number of rotations of the drive rolls 28 and 29 may also be effected with the described control arrangement, for urging the extrusion out of the extruder. The feed-back tachometer 29T is provided in FIG. 5 for speed control means, if such control is necessary.

FIG. 6a shows means for effecting speed control of such servos as the ram cylinder 27 or the motor 29' powering the drive roller 29 which coacts with 28 to urge the members 15 from the extruder. An output-speed feedback tachometer 29T is shown connected in series with the wiper arm 219' of a command potentiometer 219", which may be controlled in the same manner as the wiper of FIG. 6. Tachometer 29T is also connected to the magnetic amplifier 217 and is in parallel circuit with the coil 217" of the stroker feed-back tachometer 216'. The inner position loop of the electric stroker is left cut to obtain an integration from the stroker. The pulse or signal controlled shaft 221 controls the wiper 219' of 219" as described to provide a variable speed command voltage in accordance with a signal or signals recorded on the tape 200. It is noted that the control means of FIG. 6 may also be used to provide a form of speed control, since the rate of change of position of the shaft 205' and hence the rate of variation of the output of the pump 205 which is directly related to the speed of the servo driven thereby, is a function of the rate at which the potentiometer 219 is varied, which variation depends on the number and spacing or rate of reproduction of the command pulses used for varying the position of wiper arm 219'. If an analog or variable amplitude signal recorded on a channel of the tape 200 is used as a source of variable command voltage by utilizing a linear reproduction amplifier A1, the output of said amplifier may be connected as illustrated in FIG. 6a whereby the rate of change of amplitude of the recorded analog signal will produce a variable voltage for controlling servo will be a function of the rate of change of the reproduced signals amplitude. Thus, a predetermined variation in output speed and acceleration may be provided to occur at a predetermined time during the extrusion cycle for effecting predetermined volume flow, drive and/or movement of one or more of the illustrated servos or stop extrusion means.

FIG. 6b is a schematic diagram showing details of the analog signal control means referred to in FIG. 5 for controlling the output of the variable displacement pump 206 which controls the motion of the hydraulic servo 27. This arrangement may also be used for controlling the other servos of the extrusion apparatus such as those driving the tools, mandrel, conveying means, etc., which require positional as well as speed control. The reproduction head T1 reproduces the analog signal recorded on its track. Said signal is amplified in the linear amplifier A1 and provided on its output as a predetermined command voltage proportional to the amplitude of the recorded signal. This command voltage is compared with the output voltage of the feed-back potentiometer 218 which is connected as in FIG. 6 by gearing to the shaft of the electrical stroker motor. The error signal voltage is amplified in the magnetic amplifier 217 and drives the stroker motor until the value of 218 and the output of A1 are equal. In FIG. 6b and in the other drawings where provided, the notation PS refers to a power supply.

While the control apparatus shown in FIGS. 1 to 6 is illustrated as applicable to extrusion apparatus, it is noted that it is not limited in application thereto. For example, any elongated member, such as a preformed structural channel, angle, pipe or beam of substantially constant cross-section may be fed a substantially constant or predetermined speed, as in the extrusion 15, past a plurality of servo operated tools certain of which may be controllable by the electro-hydraulic servo system as described to perform various recorded signal controlled variable operations on the work such as milling, turning, drilling, blending and the like and others of which may be controllable to perform a single predetermined operation such as drilling, tapping, punching, spraying or the like such as the device 211 of FIG. 5. These tools may be operative during a predetermined point in an extrusion cycle to advance against the work while stopped (by control of the means for moving the work such as 27) and/or may move with the work as is tool 47 while operating thereon. A cycle of control may be effected by means of an endless track recording and playback means as described.

Figure 8:
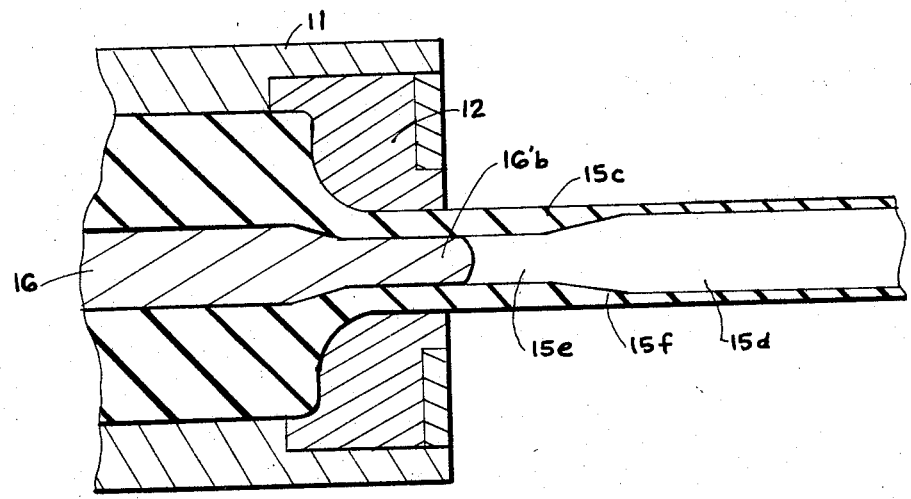
FIG. 8 is the same view as FIG. 7 showing the mandrel in a retracted position whereby the extrusion is provided with a greater wall thickness than the portion being extruded in FIG. 7.
Figure 19:
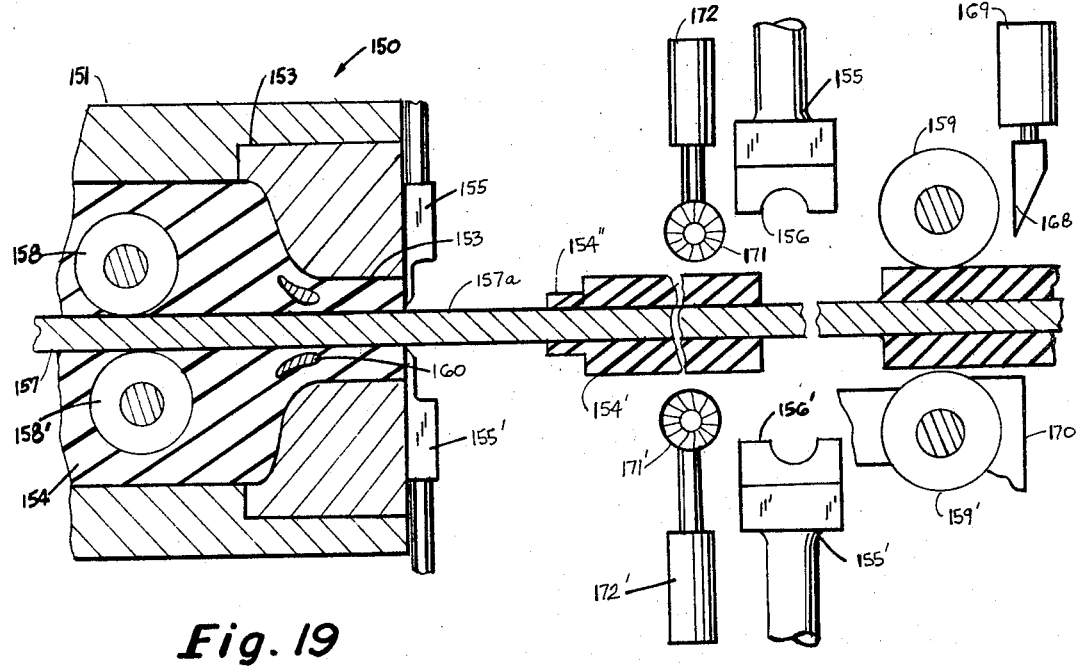
FIG. 19 is a side elevational view in cross section of a portion of an extruder adapted for extruding material onto predetermined lengths of a preshaped member and includes further apparatus for performing various operations on the resulting composite article.
Figure 20:
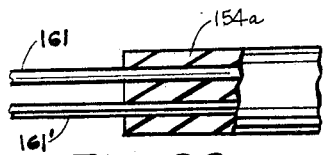
FIG. 20 is a side view in partial cross section of a fragment of an extrusion producible by a modified apparatus of the type illustrated in FIG. 19.

FIGS. 7 and 8 show further details of the die and mandrel applicable for the production of a tubular member having portions of the length with one internal shape situated adjacent portions of a second shape with a different internal diameter. The mandrel 16' tapers or otherwise reduces in external shape from a large diameter portion 16'a to a reduced diameter 16'b near the nose end thereof. When the mandrel is extended as in FIG. 7, a tubing having the thin wall 15a is extruded. When the nose 16'b is retracted as in FIG. 8 a larger annular volume is provided between 16'b and the wall of the die opening such that the inside diameter of the extrusion decreases to that shown at the section 15e which is interiorly determined by the mandrel section 16'b. Thus, a tube of varying internal diameter may be shaped by moving 16' in and out of the die opening at desired instances in the extrusion cycle to provide the increased and decreased wall thickness sections where needed, which action may or may not be accompanied by operation of one or more stop-extrusion blades as described for varying external shape in accordance with a predetermined program.

FIGS. 9 and 10 show details of stop extrusion apparatus for providing multiple parallelly extending projections, ridges, channels or cutouts in a wide extruded member such as a plate. The die shown in the end view, FIG. 10 of the die 120a of the apparatus of FIG. 9 is applicable to provide a wide sheet like formation with fins, extruded through multiple openings 126' projecting off one surface of the said die opening 126, which provides a wide sheet or plate extrusion having multiple longitudinal stiffeners referred to in FIG. 9 by the notation 128. Multiple stop extrusion blades 121 are provided on mounts or cylinders 122 secured to the end wall 120' of the extruder chamber 120, each adapted to be projected over and when so advanced to stop the formation of a respective of the ribs on the base sheet 129. If all the cylinders 122 are controlled to project and retract their respective tools simultaneously, a sheet or panel 127 having reenforcing stiffeners of the same length will be produced as illustrated. The notation 120 refers to the sections of the extrusion 127 which are void of the ribs. A shear or saw is utilized to cut across the rib-free areas 130 to provide short lengths of the extrusion. The notation 132 refers to apparatus for cutting the extrusion 127 into predetermined lengths. A circular saw blade 136 is provided on a mount and power rotated by means, not shown, to effect a cut when advanced across the extrusion 127 in the area 130. If extrusion is stopped momentarily while the blade 136 advances, a simple swing or track mounted and power driven saw may be utilized. However, if it is desired not to stop the extrusion action, the saw frame 133 may be advanced at the same speed as the extrusion along tracks 134 and 135 by motor driven means not shown but interlocked and controlled to occur at the speed of extrusion by means of said described control system whereafter the saw automatically returned closer to the extruder for the next cut.

The multiple servos 122 for advancing the stop tools 121 across the openings 126' in the die are shown held against the end wall 120' of the die or extrusion chamber 120 by a bucking bar 125 secured against the end wall 120' on end blocks 124 and 124'. The notation 132 refers to a roller conveyor utilized to help convey the extrusion away from the extruder which preferably also extends beyond the saw or shears to convey the cut sections to the next machine. The notation 123 refers to fluid lines leading to and from each servo. It is noted that the extruded ribs 128 may have any desired cross section and that the tools need not be operated simultaneously but may be projected in any desired order to reenforce, for example, a sheet or plate in desired areas thereof or to provide ribs, flanges, shelves, or the like along a plate or sheet where needed for fastening thereto or for other purposes such as wall formations, shelves, compartments, or the like. In FIG. 15, the relatively narrow ribs 128 of FIG. 22 have been replaced by a series of short but heavy stumps 141 integrally formed on the base plate 140 by the means of FIG. 9. These stumps 141 may be provided where needed as bosses for drilled and tapped holes where it is necessary to provide additional material, or as means for supporting said plate spaced apart from another plate such as in a reenforced panel assembly. As the cross sectional area of the projecting sections increases, it will be necessary to provide a support for said sheet such as the bucking bar 131 of FIG. 9 which is secured to the end wall 120' of the machine 120 in accordance with prior teachings and opposes the bending action of the blades 121 when they are advanced against the extrusion. By oscillating the tools or blades at a higher frequency, a spur gear like formation may be provided in a rib or in a surface of an elongated member as well as decorative designs and the like provided on the surface against which said tool is advanced.

Also shown in FIG. 10 in broken line notation is a means for varying the width of the member 126 or any wide sheet or plate extrusion with or without the rib like formations 128. This comprises a stop tool including a long blade 121' adapted for lateral movement across the opening 126 a predetermined degree either prior to extrusion or as the material is expressing, whereby a predetermined width of the die opening is shut off and the flow therethrough is effectively blocked so that a sheet of lesser width is extruded than with the blade 121' retracted. The blade 121' is urged by a hydraulic cylinder 122' or is clamped in position prior to extruding between clamping plates or fixtures 125'. If it is desired to move said blade 121' during extrusion to provide a sheet of varying lateral contour, the device 125' will comprise a support bar similar to 125 of FIG. 9 for slidably engaging said blade against the face of die 120a in accordance with the teachings of FIG. 2. By automatically controlling the operation of hydraulic cylinder 122' by the means provided hereafter to control the speed and position of the blade 121' as the sheet 126 or a constant thickness sheet or plate extrudes, the sheet 126 may be carved by said blade, without the production of waste material usually associated with contour cutting, to a predetermined contour in accordance with the motion of 121'.

Also shown in FIG. 10, in broken outline, is a tapered stop extrusion blade 121'a having an edge or side 121'e thereof which covers and stops-off an increasing width of the die opening 126 as the blade 121'a is advanced normal thereto in the direction of the arrow A. Thus by controlling the degree of motion of the blade the degree of the wide die opening 126 which is closed off or remains may be controlled and predetermined. The triangular or tapered outline blade 121'a may also be adapted to any of the extrusion apparatus shown elsewhere in this application.

FIG. 11 shows structural details of a reinforced panel or sheet which may be produced by the apparatus of FIG. 9 and which is applicable as a wall or panel for trucks, boats, containers, cubicles and other products requiring a wall or partition of substantially greater strength than a sheet of metal. The panel 127' is similar to 127 of FIG. 9 in that a series of longitudinally extending stiffeners or ribs 128' are provided integral with a base sheet or plate 129'. However, these ribs, referred to by the general notation 128', are each formed and divided into a series of longitudinal sections 128a, 128b, 128c, etc. as illustrated to permit the securing or formation in the areas 130a, 130b, 130c, etc., of a series of laterally extending stiffening members or beam supports one of which, 125, is shown at the far end of the sheet on the flat area 132 which is free of the longitudinal members 128'. The stiffener free zones 130b, 130c, etc., may also serve to permit bending of the panel 127' along said zones into a box or other shaped container or member. Said rib free zones 130 may be provided by one of several means including (a) by the stop extrusion means of FIG. 9 whereby the stop blades 121 advance to the surface of the sheet 129' and retract at controlled intervals in the extrusion cycle; (b) by running a milling cutter one or more times across each zone to the surface of 129' to cut away the ribbed sections 128' as shown either on the fly as described during extrusion or after the panel has been formed to shape; (c) a combination of the described stop extrusion and milling. The latter technique of combining stop extrusion and milling would be required when it is required that the end faces 128e of the ribs be normal to the surface of 128e and planer in shape for abutting said lateral support members and where such a facial shape cannot be attained by stop extrusion, particularly if the extrusion process is not slowed down or stopped during the operation of the stop blades. While this requires additional work to refinish the panel, it is noted that milling is considerably simplified and there is less waste material.

Further designs of the panel 127' are noted. The integrally formed ribs 128e may have most any desired shape which can be extruded. They may be tubular as in FIGS. 16 and 17, angle, channel, Z I or other shape with a wall of said shape formed integral with the base sheet section 129'. One or more of the ribs 128' may also be formed with a slot extending part way along or completely along the length of said rib for receiving and holding a sheet such as a shelf or pane of glass. FIG. 12 shows details of such a rib 128s. The slot 128s' is shown extending along only part of the rim 128b3 of FIG. 11 and is preferably formed by a stop extrusion blade coacting with the blade or tool which forms the rib 128b3. Such a slot may also be post-formed or formed on-the-fly by a tool such as an end milling machine and end-mill cutter. It may also be formed as the panel 127' extrudes by a stationary milling machine merely advancing a rotating end mill cutter against the rib 128b3 as it moves past and cutting said slot by virtue of its motion relative to the blades of the rotating cutter. Such a milling machine would preferably be mounted on a bracket secured to the extruded 11 or the frame 21 (ref. FIG. 1) and would be automatically controlled by automatic sequencing means described hereafter to provide a slot 128s' of the desired length and at a predetermined position along predetermined of said ribs 128'.

The lateral support member 125 which may be secured along 127' at any of the shelf or rib free areas 120, may have any desired shape such as a plate, solid beam, angle, channel or the like or a hollow shape such as a length of square tubing. The notation W refers to a weld or bond between the edge faces 128e and/or the surface of the base sheet 129' and the abutting surface of the member 125 which may also be secured thereto with rivets or fasteners. As a further suggested construction, members similar to 125 be formed by bending or otherwise post-forming the material of the base sheet 129' in the rib free sections thereof.

FIG. 13 shows apparatus for providing lateral changes in cross-section in an extruding member such as the extrusion 127' whereby the laterally extending ribs or beams 125 may be formed integral with the base sheet 129' and the ribs 128'. The end view shows wide stop-extrusion means comprising a tool 30" having the stop-blade section thereof formed with a series of indentations or notches 30"b for forming the rib sections 128' between separate blade sections 30"c. When the tool 30" is retracted from the area of the die opening 30"o as shown, a solid section such as 125 having the cross-section of said die opening, is extruded. When 30" is projected across the opening 30"o so that the extreme edge of the tapered section 30"c' of the blades 30"c forms the surface of the sheet section 129', the ribs 128' will extrude through the center notches or openings 30"b and the edge ribs 128a will be formed in the opening provided between the edge notches 30"a of the tool and the edge wall of the die. If the blade segments 30"c are projected to stop-off the complete die opening with material expressing only through the notch sections or openings 30"b and the blade 30" is intermittently oscillated, a lattice-like solid structure may be formed having longitudinal bar or strip like elements integrally formed with lateral strip or bar like elements. Such a structure may be made in metal or plastic and may be used as a mush, screen or frame for use in partitions or on fences or as a net. It may also be provided on the surface of an extruded sheet if the stop-extrusion tool is not advanced completely across the die opening 30". It may be produced in flexible or rigid plastic or metal.

Also shown in FIG. 13 is a stop etxrusion tool mounted on the tool 30" for providing one or more slots of predetermined length in one of the ribs. Multiple tools, each mounted on 30" over a section 30"a or 30"b may also be provided to slot or otherwise change the shape of the section formed thereopposite by advancing against said ribbed sections as they are formed to stop-off part of the openings provided by notched sections 30"b and 30"c. The tool 30"d is a narrow blade advanced by a hydraulic cylinder 30"e bolted to the face of 30." The blade 30"d may be supported by a bucking bar or plate 33 secured to the face of 30" in a manner as heretofore described. If the slot 128s' of FIG. 12 extends the whole length of the section 128s, then the separately acting blade 30"d will not be needed as the slot may be formed by providing the blade secured to or integral with the tool 30" and projecting partly into the notched sections 30"a and 30"b from the upper edges thereof. The blade 30"d of FIG. 13 may be mounted and shaped whereby it slidably engages the face of the tool 30" so that when it projects across the cut-out section 30"b of 30" it will effectively seal and block said opening and shape the extrusion in the manner that 30" operates when the sections 30"c are projected across said die opening.

FIG. 14 is a partial isometric view of the stop-extrusion apparatus of FIG. 13 showing the formation of a lattice structure comprising a series of longitudinally extending ribs or strips 128" formed integral with a series of parallel lateral strips or rod like sections 125' without material therebetween. The net 150 is formed, as described, by advancing the stop blade 30" so that the edge of 30"c abuts the surface of the support or bar 63 for the extruding material thereby permitting only the flow through the openings 30"b until the blade 30" is momentarily lifted to permit the formation of a lateral section 125'. Since the bar or plate 63 which is secured by a bracket 63' to the face 11a of the extruder is stationary, it will offer some resistance to the flow of the extruding lattice 150, it may be necessary to help urge said extrusion out of and away from said die by means of powered rollers such as described. If the material being extruded is plastic, the surface of support plate 63 may be coated or covered with a fluorocarbon resin to reduce friction. Also, both the blade and the forward end of the die may be heated and temperature controlled such that the plastic remains semi-molten during a cycle.

FIGS. 16 and 17 show two additional formations on extrusions which are provided by stop extrusion means as described. In FIG. 16, one or more box-like projections 137 are provided formed integral with a base member 136 shown as a sheet. The projecting structures 137 may be used for supporting the base 136 away from another sheet, plate or support member or may be used as a bracket protruding from a beam or other extruded base member generally secured thereto by fasteners or by welding. In FIG. 17, predetermined lengths of tubular-like projections 143 are provided on a base plate or sheet 142 and may be used for engaging pins, rods, tubes or shafts. The spaces 145 between the formations 143 may accommodate similar formations on a second extrusion and a hinge or hinged panel may thus be formed by passing a rod or pin through the cylindrical hole 144 extending through the formations. In order to provide a right angle cutoff or shape at ends of sections 143 as illustrated, the blade may be rapidly advanced and retracted, the member may be milled or otherwise machined by substituting a cutting blade in the form of a shear or circular saw blade driven across the opening in the die in the direction of arrow A1 rather than normal to the sheet as taught in FIG. 9 in the direction of A2. Or, a flying cutter may be advanced across the ends of the formations 143 after they have been formed at the same speed as the extruding sheet to cut off any irregular or tapered formation at the ends of 143 due to the motion of the sheet when the stop blade is advanced or to the taper of the stop blade. It is noted that the described stop blades and tools may be replaced by circular saw blades or circular toothless blades advancing from either direction A1 (laterally across the extrusion) or A2 (normal to the extruding sheet) which not only reduces the forces tending to deflect the extrusion but requires less force to penetrate the section to be stopped from extrusion. A cycle may also be employed which includes the steps of stopping the extrusion action, advancing a saw blade or milling cutter of the circular rotating type or band type across the section of the extrusion to be stopped off, cutting into said section the desired degree, stopping the cutting action and using the blade as a means for preventing further flow of material across the stopped off and cut section or replacing said blade with a stop tool followed by starting servo the means for effecting extrusion of the material and continuing the extrusion until after the stop-blade or tool has been retracted and it is desired to stop-off said section again whereafter the above sequence would be repeated. This sequence of actions may be applied where the section to be stopped is too heavy to be penetrated by a wedge shaped tool as taught. The actions may be effected automatically by replacing the stop tool with a saw or milling blade and mount which is movable the desired degree by a lineal servo.

FIG. 18 is an isometric view of the end of a tube 127″ produced by extrusion having multiple longitudinal fins or reinforcing beads 128″ extending parallel to each other. The fins 128″, like those in FIG. 9, are terminated by stop-extrusion means as described short of either or both ends of 127″ providing cylindrical end sections 130″ which may be further worked or secured to a header, fitting or the like without interference from the protrusions 128″. The tube 127″ is formed in the manner of the panel 127 wherein the die opening has radially extending branch channels similar to 127′ in which the ribs 128″ are formed and two or more stop blades are urged by servo cylinders mounted on the extruder across said branch channels to prevent the formation of said blades for predetermined lengths of the extruding tube. The mandrel used for forming the inside wall of the tube may extend a degree beyond the die whereby it supports the tube against deformation by the action of the stop blades. The tubing may be cut-off along the non-finned sections thereof against the mandrel by circular cut of a gouge type cutter fed towards the axis of 127″ as it rotates in a circular path.

Figure 26:
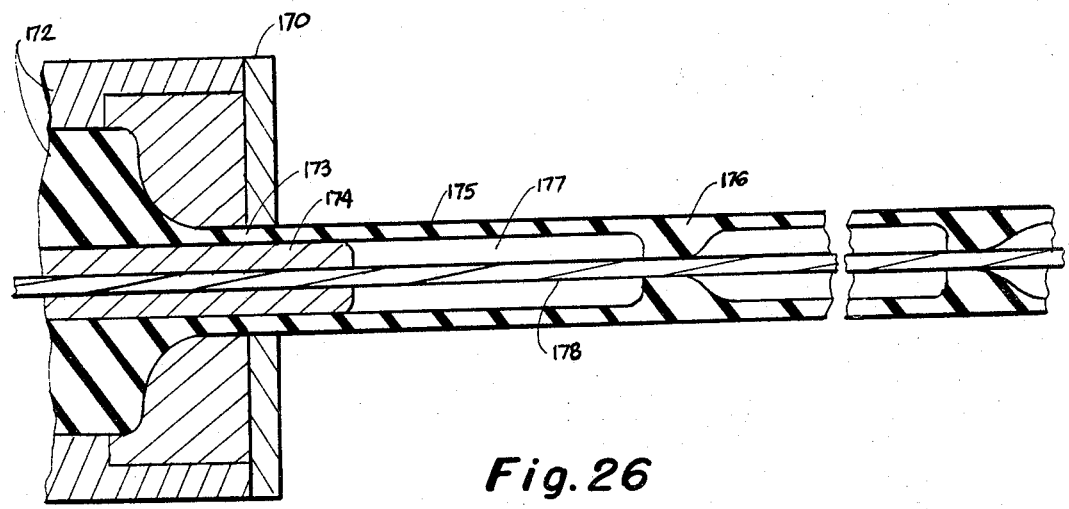
FIG. 26 is a side elevational view, in cross section of a co-axial cable and a partial view of the extrusion apparatus for producing such cable.

In FIG. 26, an extrusion apparatus is provided for extruding a thermoplastic or other material along predetermined lengths of a preshaped elongated wire, rod, tube or other shaped structural member. The apparatus 150 comprises an extruder 151 the end of which is illustrated as having a die 153 with an opening 153′ terminating the extrusion chamber 152 through which a preshaped rod, tube or wire 157 is driven by a drive roll 158 and depressor roll 158′ which are provided within the extrusion chamber and/or by means of auxiliary drive means exterior of the extrusion chamber. The member 157 may be rigid or flexible and may be intermittently fed from a plurality of lengths thereof, a coil or continuous supply means such as a second extruder in which it is formed, a stranding machine or rolling wire mill aligned with 150. Servo operated means as described may be provided for controlling the flow of extrusion material 154 through the die opening 153′ as well as the operation and degree of movement of a plurality of stop-extrusion tools, two of which 155 and 155′ are illustrated in FIG. 26 as being aligned with each other and movable together to substantially completely stop the flow of plastic material around member 157 as it is driven out of the extruder 151 and retractable to permit a jacket or covering to extrude around the exterior of member 157 as illustrated at 154′. Assuming that member 157 is cylindrically shaped, then by shaping blades 155 and 155′ with respective semi-cylindrical facing surfaces 156 and 156′, the tools when advanced against the cylindrical surface of the member 157 and sealing engaged against the face of the extruder as described, will either prevent flow of the covering plastic material over said cylindrical member or limit the flow to a thin film or coating as illustrated along section 157a. Controlled movement of either or both tools may be used to provide a variety of external shapes of the material 154 such as the illustrated cylindrical jacket 154′ shown extending along only a portion of the exterior of 157.

The notation 160 refers to a plurality of guides for guiding member 157 through the throat of the extruder which comprise pins or rods extending between walls of the extrusion die and which serve to center or preposition 157 within the die opening so that its position relative to the material extruded thereon is predetermined. The guides 160 are situated sufficiently upstream of the end of the die opening so as not to effect the shape of the material being extruded. The pins are spaced so as to permit sliding passage of the member 157 therethrough. Situated beyond the extruder is a cutting knife or shear blade 168 which is operated by a servo motor 169 and coacts with a shear block 170 to sever either sections of the member 157 which are bare of the extrusion material 154 or a length of the extrusion and core member. Like the servos driving 157, feeding extrusion material 154 and operating stop extrusion tools 155 and 155′, servo 169 is preferably sequentially controlled by a programming means such as hereinabove described to sever predetermined lengths of the extrusion coated or covered member 157 containing a jacket or coating of predetermined length and shape or a plurality of said jackets along predetermined lengths thereof to provide an article of predetermined shape.

A plurality of powered and depressor rolls such as 159 and 159′ may be provided beyond the end of the extruder which are synchronized in their operation 158 and 158′ to remove the elongated composite member from the extruder. Rolls 159 and 159′ are shown as engaging the upper and lower surfaces of the jacket 154′ and are located between the extruder and cutter 168. Notation 154″ refers to a modified portion of the jacket 154′ of smaller diameter 154′ which has been formed by partial projection of the tools 155 and 155′. It is noted that the tools may be controlled to operate in coaction with each other or separately to provide an irregular external shape in accordance with the type of programmed control of the stop extrusion tools.

In a preferred form of the invention, member 157 may comprise a solid or standed electrical conductor or wire whereupon the stop extrusion tools may be used to bare certain portions of the length thereof by preventing the flow of insulation 154 thereon which eliminates the generally required post operations relating to mechanically stripping and baring the ends of the wires to permit connecting them to electrical components, terminals and the like. For cerain types of wire, it may not be possible to precent a thin coating or film of insulation 154 from forming on the surface of 157 whereupon tools 171 and 171′ which may comprise wire brushes cutters or grinding wheels, may be operated to advance against sections 157a of the member 157 which contain said thin coating and to remove said coating therefrom. Servos 172 and 172′ respectively operate tools 171 and 171′ while further servo means (not shown) advance and retract the tools relative to the moving member 157 to perform the final stripping or clearing operation. Said further servo means is also preferably automatically controlled by the programming means controlling the other servos to effect baring of the desired sections of 157 between coated or covered portions thereof.

FIGS. 20 to 24 illustrate various extrudable shapes which may be produced with the apparatus of FIG. 26 or modifications thereof. On FIG. 20 two wires or rods 161 and 161′ are shown extending from an end of the extrusion material 154a and extend completely therethrough. The wires have been bared by operation of properly shaped stop extrusion tools and are held in separated relation by the extrusion material. The member 160 may comprise an electrical conductor or a mechanical device such as a shock absorber or bumper employing wires 161 and 161′ to secure said plastic portion 154a to a base such as a vehicle or the like.

Figure 21:
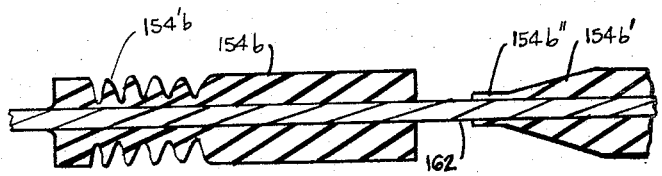
FIG. 21 is a cross sectional view of a fragment of an extrusion producible by the apparatus of FIG. 19.

In FIG. 21 a twisted electrical conductor 162 or multi-strand wire is shown covered along part of its length with a jacket portion 154b at least one end of which is tapered as at 154b′ to a thin covering or jacket 154b″. The tapered portion 154b′ may be provided to permit greater flexibility of the member at the end where it may join a fitting such as a male plug or connector. Formation 154b is shown provided with a plurality of convolutions 154′b near one end which are shaped either by rapidly advancing and retracting the tools 155 and 155′ or by the provision of a tool or tools having the blade portions thereof shaped to provide a plurality of said convolutions with each advancement against the surface of the extruding material. The convolutional shaping as at 154′b permits 154b to be easily flexed during use or in the application thereof to conform to an irregular surface.

Figure 22:
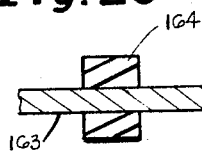
FIG. 22 is a side view of a composite article with parts broken away for clarity, which is producible by means of the apparatus of FIG. 19.

In FIG. 22 a cable, wire or core member 163 has extruded by the means hereinabove described, a plurality of short lengths 164 of extrusion material in spaced apart array which serve as spacers for 163 when placed inside a jacket or tubing for the fabrication of a coaxial cable. The jacket may be spiral wound or extruded over the spacers by driving the assembly of FIG. 22 through an extruder as described.

Figure 23:
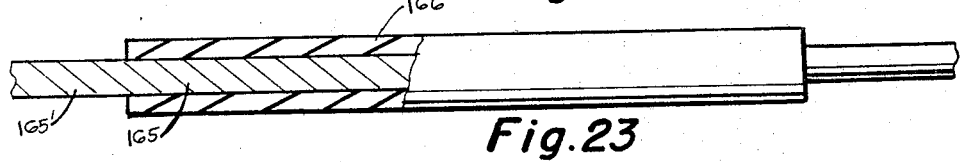
FIG. 23 is a side, partially cross sectioned view of another composite article producible by means of the apparatus of FIG. 19.

In FIG. 23 an elongated jacket 166 is extruded on part of the length of an elongated, bendable metal wire 165. The bare end portions 165′ of the composite article may serve one or more of a plurality of functions including portions of an article which are easily bent to desired shape and/or are welded or otherwise fastened to other such wires or articles.

Figures 24, 25:
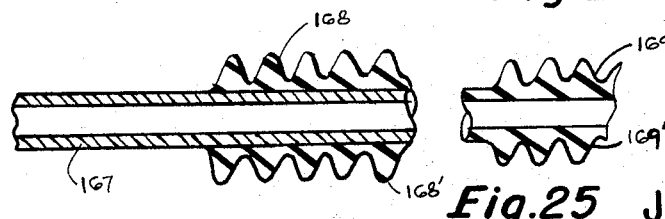
FIG. 24 is a side, cross sectional view of another composite article having a convoluted wall.
FIG. 25 is a view of a fragment of an extrusion producible by the apparatus of FIG. 19.

In FIG. 24 the core member 167 comprises an elongated tube which may be flexible or rigid. The extruded-on jacket 168 is shown having a plurality of convolutions provided therein. The convolutions may serve to permit greater flexibility than a cylindrical or smooth walled jacket for deflecting the tubular member while in use. They may also be used for heat transfer purposes or for spacing the core tube away from the wall of a further tube or jacket in which the assembly may be placed. The convolutions may be formed as described by oscillating the stop tools as the core is driven out of the extrusion die.

FIG. 25 illustrates a tube 169 made of a flexible plastic material or metal which has been extruded and post shaped with a plurality of convolutions or fins 169′ formed in the outer surface of the tubing by the thereinabove described stop extrusion means. The fins may be used for heat transfer purposes and/or for providing either the entire length of the tubing or predetermined portions of the length thereof flexible and capable of being deflected or bent without collapsing. Depending on the manner in which the stop extrusion tool are controlled and positioned relative to the extruding tube, various changes as described in external and/or internal shape of the tubing may be effected for various purposes such as facilitating fastening or holding the extrusion length. For example, increased or decreased wall thickness sections may be provided along portions of the tubing which are to be severed from the supply thereof which may be further shaped or others serve to receive fittings, inserts or couplings.

The described technique of oscillating a stop extrusion blade against an extrusion while still in a semi-molten or formable condition may also be utilized to provide lateral ribs or convolutions in various other shapes such as sheet formations, panels, or the like for the formation of corrugated or surface ribbed sheets and panels.

Figure 27:
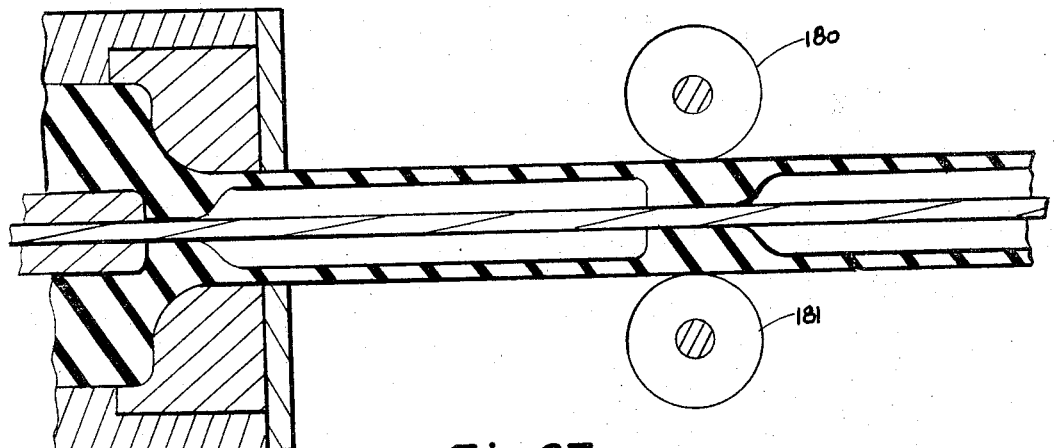
FIG. 27 shows the apparatus of FIG. 26 with the extrusion mandrel retracted whereby a solid portion of the extrusion is produced.

FIGS. 26 and 27 illustrate an extrusion apparatus of the type described which is modified for the automatic production of an electrical conductor such as a coaxial cable. The end of an extruder 170 is shown with an axially movable mandrel 174 shown in FIG. 26 as extending through the opening 173 in a die 172 which terminates the extrusion chamber 172. A tubular extrusion 175 is produced when the mandrel is extended as in FIG. 26 and a solid extrusion portion 176 is produced when the mandrel is retracted as in FIG. 27. A wire, electrical cable, or group of wires 178 is fed axially through an opening in the center of the mandrel at the same rate as the extruded material travels beyond the extrusion die and is held in spaced relation from the wall of tubular portion 175 by the material comprising portions 176 which flows against the exterior surface of 178 while the mandrel is retracted. The movement and position of mandrel 174 as well as the pressure of delivery of the extruding material are prefer-ably so controlled by the means hereinabove described that said material is eased slowly out of the throat of the die to permit the extruding material to flow over the nose of 174 and forms one end of the plug-like section 176 without said material ejecting into the void 177 defined by the tubular wall forming interior surface 176′. Surface 176″ is formed by advancement of 174 into the mass passing ahead of the mandrel which preferably moves at or a faster rate than the rate of flow of 176 through the die. A plurality of drive rolls 180 and 181 preferably engage and drive the extruded material when the more solid portions 176 are aligned therewith.

It is noted that an insulating liquid dielectric, or other material such as a foaming plastic, fluent solid, inert gas or the like may be injected into the volumes 177 and encapsulated therein when annular formations 46 are formed. Injection of predetermined quantities of the encapsulant material may be effected, as described, through an opening in the mandrel fed from a source as illustrated in FIG. 1 and automatically flow controlled by the described programming means or other automatic means to provide a predetermined quantity of fluid in each volume 177. The programming means is preferably also operative to control the rate of flow of extrusion material from which 175 is formed, position of mandrel 174 and travel of 178 which is preferably at the same lineal speed as the extruding member.

The centrally disposed member 178 may also comprise one or more preshaped reinforcements such as rods which are spaced apart within the extrusion, a tube, coaxial cable per se, threads, filaments or the like. It, 178, may also comprise an extruding member made of a different material than that of the material comprising 175 and formed in another extruder (not shown) or extruded to shape through the opening in the mandrel 174 from a supply other than that existing in chamber 172. Various post-forming or fabricating operations may be effected automatically as elsewhere described herein for operating on the extruded assembly such as cutting it to predetermined lengths, baring the ends of the wire 178, punching or drilling holes therein, apply end fittings, etc. while the extrusion is stopped or as the shape extrudes. The mandrel nose 174 may also be shaped to provide supporting sections 176 as one or a plurality of fins having voids between each for communicating between chambers 177 permitting a fluid to be circulated around 178. If 178 is a tube or tubular formation extruded with the outerwall it may be used to carry one fluid while outer annular volume 177 is used to conduct a second fluid.

If core member 178 comprises a tube or tubing it may be extruded of a plastic material or metal which is either more flexible or more rigid than the material extruded to form the outer jacket 175, depending on the requirements of the finished tubular assembly. If the inner member 178 is tubing, it may be extruded from the end of mandrel 174 by the provision of the correctly shaped duct and smaller mandrel therein. A requisite of the material extruding to the shape of the core member 178 is that it be capable of supporting the material of the outer extrusion at the solid sections 176 without being buckled or collapsed thereby and that it will not be deformed or melted by heat transferred thereto from the material comprising sections 176 when flowed thereon. To prevent such deformation or flow, the sub-mandrel (not shown) supported within mandrel 174 preferably projects sufficiently downstream of the mandrel 174 to support both the core hollow extrusion formed thereon and the material flowing over said hollow extrusion. Such an inner extruded tube or core may also be rapidly cooled to solidify by injecting air to the interior thereof through the sub-mandrel.

If the material comprising core member 178 is extruded to shape through mandrel 174 and said mandrel is retained retracted during extrusion, a solid extrusion will be effected in which the core member may extend through the entire length or predetermined portions of the length thereof. One or a plurality of such extruded filaments or core rods may be employed and so extruded within the solid extrusion for decorative purposes and/or for reinforcing the extrusion along its entire length or along predetermined portions of its lengths by extruding plural filaments or rods through a plurality of openings in the mandrel either continuously as described or intermittently in accordance with an automatic controlled valving means or a programmed valving means feeding one or more of the ducts in said mandrel. Plural, separately contrallable valves may be provided.

Said afore described valves may be utilized to gate one or more streams of the same or different extrusion materials from the mandrel and/or walls of the die opening through respective openings therein under sufficient pressure such that a continuous filament or ribbon of material is extruded and retains substantially the shape it is expressed from the opening in. The plural reinforcing or decorating rods or ribbons of plastic may be controlled to extend along predetermined lengths of the interior or exterior surface of the extrusion to the exclusion of other lengths thereof to obtain various decorative effects by automatic control of said valving means through which said material(s) flow. Said control may be effected by a programming means such as the system illustrated in FIGS. 5 and 6. In another form of the invention openings may be provided in the mandrel nose and/or extrusion die wall through which different colored thermoplastic materials may flow for controlled decoration of the exterior of opaque extruded members and/or the interior of transparent, tubular extrusions. Automatic control as described of the valving means for each color, opening or group of openings may be utilized to provide different color combinations along different lengths of the extrusion in accordance with the programmed input or recording. If, for example, the extrusion is to be provided as a parison for blow molding, colored stripes may be provided on the interior and/or exterior of the extrusion which extend along only part of the parison leaving other portions of the length of the parison or molding therefrom, free of decoration to facilitate labelling or further decoration. Or, by providing two or more openings in the mandrel or die wall which are in longitudinal alignment and each of which terminates a pressurized supply of a different colored plastic with valving means for controlling the flow of each, controlled as described, a stripe may be provided on an extrusion which varies in color along the length of the extrusion. The valves for each color are sequentially controlled as described or by other means.

The above described means for decorating a tubular extrusion may be applicable for the decoration and/or reinforcement of any extrudable shape by modifying the mandrel and/or die as described for extruding one or more other materials or the same material as that of which the main extrusion is produced but differently colored. For example, flat or irregularly surfaced sheets may be reinforced with rods or ribbons of extruded material applied to either or both surfaces thereof or extruded between the major surfaces of the sheets. Compatible materials which may be utilized are combinations such as rigid, linear and low density polyethylene, rigid and flexible vinyl, polycarbonate resin extruded as rods of filaments in any compatible thermoplastic or thermosetting resin, polypropylene in low density polyethylene or flexible vinyl and others. Sheets of flexible material may be reinforced by parallelly extruded rods or ribbons of the more rigid plastics extending into the sheet from a surface thereof or encapsulated within the sheet. The reinforcing strips or filaments may extend the length of the sheet or may be extruded during only predetermined points in an extrusion cycle at spaced apart intervals or widths of the sheet leaving portions of the sheet or extrusion flexible where desired. Said stop-extrusion means may also be operative to provide such filament or ribbon reinforcements along only predetermined widths of the sheet to impart predetermined physical characteristics to predetermined portions of the sheet, or otherwise shaped extrusion. If the extruder, die and stop extrusion means are modified to permit the simultaneous extrusion of two different materials with each comprising a portion of the extrusion such as a particular width of a sheet, extrusions of composite materials may also be fabricated. For example, a sheet may be extruded with a central portion or width which is extruded of a flexible material with either or both borders of said sheet comprising more rigid material extruded simultaneously and at the same rate as the central portion. Rigid and flexible vinyls, polyethylenes, polypropylenes or the like may be so simultaneously extruded from different portions of the same die by terminating the partition dividing the inlet flow of each material in advance of the portion of the extrusion die in which at least one of the materials solidifies so that the edges of the respective shapes of both materials will run together and unite into a unitary extrusion when both materials solidify thereafter. Other articles which may be so extruded include sheets with a central portion or width made of a rigid plastic and borders or a border of a flexible material, flexible sheet materials having rigid structural members such as channels, angles, T's or tubing of any shape extruded along the entire length or provided only along predetermined lengths of the flexible member by means of the stop extrusion means hereinabove provided, rigid sheets having flexible flaps, ducts or other formations extruded along all or predetermined lengths of the extrusion, etc.

FIGS. 28 to 32 illustrate extrusion apparatus of the type described which is applicable for the automatic production of elongated sheet-like members having core members integrally extruded therein. In particular, flat electrical conduits having a plurality of electrical wires or flat strip conductors of different lengths embedded in a sheet or other extruded shape, and each of a predetermined length which may be different from other lengths of similar conductors embedded in the same sheet, may be produced for various electrical applications requiring bundles of conductors.

The apparatus 300 may be automatically operated by a programming means for controlling all the variable servos or pulse actuated devices to be described and comprises an extrusion chamber 301 terminating a means for supplying and feeding an extrusion material such as any suitable thermoplastic plastic material to an opening 314 in an extrusion die 313. A plurality of elongated electrical conductors 306 which may be flat narrow strips or bars of metal, or single or multi-strand wires are simultaneously fed from respective supply coils thereof (not shown) and automatically cut to predetermined lengths and fed through the die-opening 314. A separately operable motor driven drive means for each conductor strip 306 is provided which may be mounted and operative either within the extrusion chamber 302 or externally thereof to permit the selective and separately controlled movement of each of said strips through the die opening 314.

Reference is now made to the extruded shape 350 illustrated in FIG. 29 which will be described prior to further describing the means for automatically effecting such a shape. It is known in the art to produce flat, flexible extruded sheets containing plural, parallel strips of sheet-metal each running substantially the length of the extrusion for providing electrical harnesses containing individual conductors for connecting selected or respective components of an electrical system together. Practically every application of such flat harnesses requires substantial post forming operations which include the cutting of individual conductors to particular lengths which are generally shorter than the length of the extrusion, the slitting or die-cutting of predetermined lengths of material adjacent each strip to permit it to extend laterally from the main sheet, the baring of the ends of each length of conductor and the provision of holes partly through the extrusion to the surfaces of the strips to permit solder or mechanical connection thereto.

Figures 29, 31:
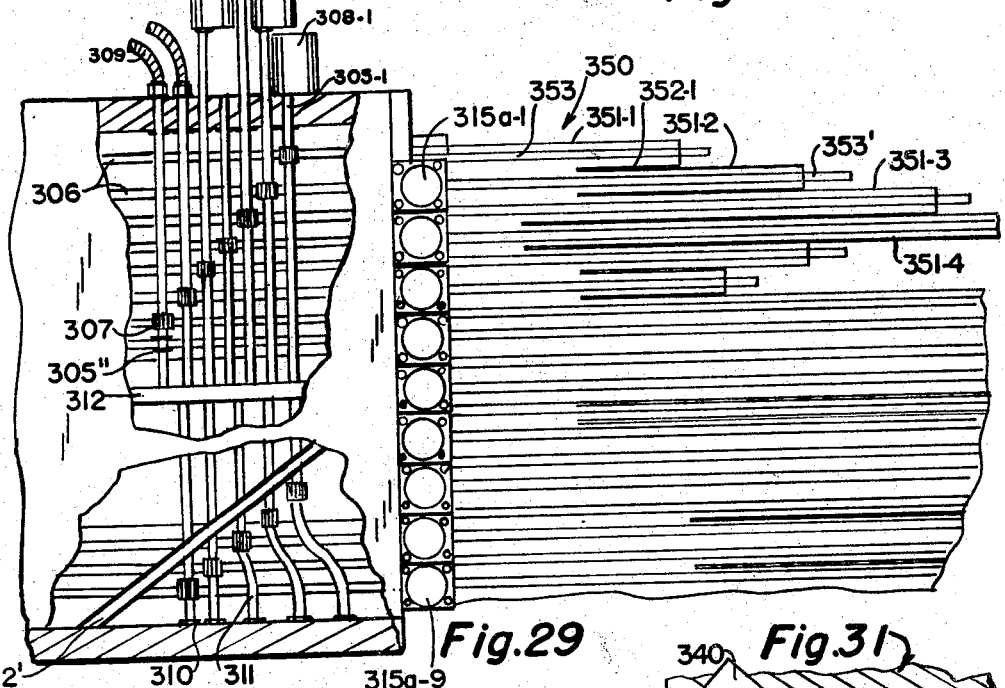
FIG. 29 is a plan view of the apparatus of FIG. 28 with parts broken away for clarity.
FIG. 31 is a partial, side elevational view in cross section of a modified apparatus of the type illustrated in FIG. 28 showing a modified form of drive for a conducting element.

FIG. 29 illustrates the extrusion 350 as having a plurality of electrical strip or wire conductors 353 certain of which are of different lengths than others and each of which occupies a particular lateral portion of 350 which portions or longitudinal strip-volumes of 350 are defined by the notations 351–1, 352–1, 353–1, etc. Notations 352–1, 352–2, etc., refer to longitudinal slits or cuts provided between adjacent strips 350 which define different free lengths of said strips which are integrally joined to the main sheet. These slits extend along different lengths of the extrusion and may each define one or a plurality of conductors such as the band containing conductors 351–14 and 351–15. Notation 353' refers to the bare ends of the conducting strips which baring has been automatically effected by means to be described.

A plurality of adjacent stop-extrusion tools 315a and 315b are shown secured to the front face of the extrusion die 313 with each having a tool or blade 316 adapted to slidably and sealingly engage the face of the die to obstruct a respective portion of the width of the die opening which is equivalent to one of the strip portions 351 of the extrusion 350. The side-walls of each stop-extrusion blade are preferably slidably and sealingly engageable with adjacent blades so that if two or more adjacent blades are simultaneously moved to block off a width of the die expressing area equivalent to the sum of the two, material will not extrude between the two.

The stop-extrusion tools comprise an upper bank of blades 316 and a lower bank of blades 316' with the blades of each bank being offset from those of the other so that adjacent widths of the sheet are controlled or prevented from being extruded by blades from each bank. This arrangement is provided to permit side-by-side mounting of lineal servos or cylinders 315 for individually moving the stop-extrusion tools which servos may have greater width dimensions than the widths of the individual strip portions of the sheet 350.

Figures 28, 32:
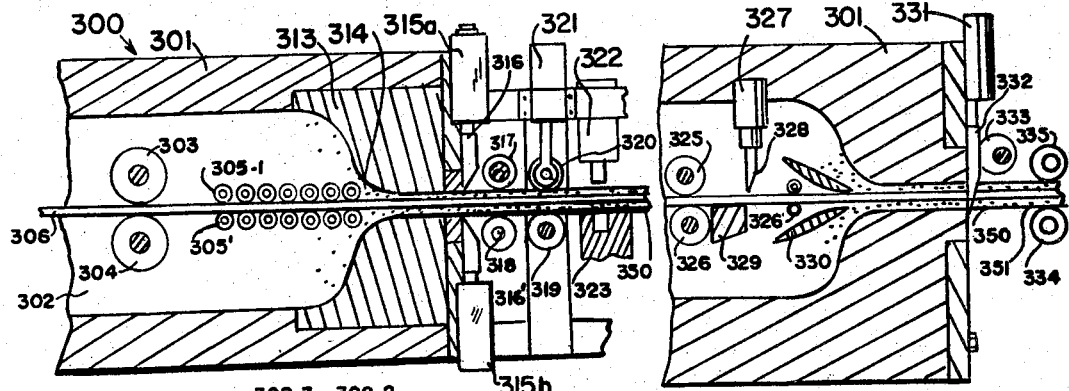
FIG. 28 is a partial, side view in partial cross section of an extrusion apparatus for producing an electrical cable or harness of improved design.
FIG. 32 shows in side elevational view a modified form of apparatus of the type illustrated in FIG. 28.

Plural means are also provided for individually and selectively driving respective conductors 306 so that when a blade is projected from a retracted position to a position blocking the width of the die controlled thereby, the conductor associated with said width may be stopped in its travel at the proper instant to prevent it from being driven against the projected blade and deformed thereby. In FIG. 28 (the means for severing) each conductor is severed from the supply or section thereof passing through the extruder when the stop tool is advanced across the die opening by the tool itself, the outer edge of which is sharp enough and cooperates with the face of the die in acting as a shearing means for its associated conductor.

The individual conducting wires or strips 306 may each be driven by a respective controllable servo or servos mounted within or exterior of the extrusion chamber 302. In FIG. 28, individual drive shafts 305, referred to by the notations 305–1, 305–2, etc., are rotationally mounted within the extrusion chamber 301 adjacent the strips. Each shaft is separately rotatable by a respective servo 308 and mounts a drive wheel 307 which engages one of the strips 306 in cooperation with a wheel 307' supported on a shaft 305' rotationally mounted below the parallel array of said strips which is one of a plurality of such shafts arranged in parallel below the parallel array of strips. Since the conductors 306 may be necessarily closely spaced together, the problem of providing adjacent drive wheels of sufficient diameter to move the conductors may be solved by staggering the drive wheels 305 and respective depressor wheels as illustrated. The drive motors 308 may also be staggered exterior of the extruder as shown or mounted inside the extrusion chamber. Notation 312 refers to a bar mounted within the extrusion chamber and supported by the top wall of the extruder which bar serves as a bearing support means for a plurality of said drive shafts which are shown extending from both sides thereof to the side walls of the extruder. The problem of coupling power to drive respective of the closely positioned drive shafts 305 may be simplified further by driving all or certain of said shafts through flexible drive shafts 310 which pass through holes in the side walls of the extruder. Sealing the volume between the drive shaft sheaving and the hole through which each passes may be effected by welding said flexible drive shaft jacket to the wall of the die as shown at 311. The advantage of using multiple flexible drive shafts so that the flexible shafts may fan out and pass through holes in the die wall which are spaced sufficiently far apart to permit respective servo motors to be operatively coupled to said drive shafts without interfering with each other.

Notation 312' refers to a diagonally extending bar for supporting the ends of the shafts 305 which are driven by the flexible shafts 310.

Flexible shafts 309 are shown coupled to two of the conductor drive shafts exterior of the extruder to facilitate arranging motor drive means which would ordinarily interfere with motors 308–1, 308–2, and 308–3.

Figure 30:
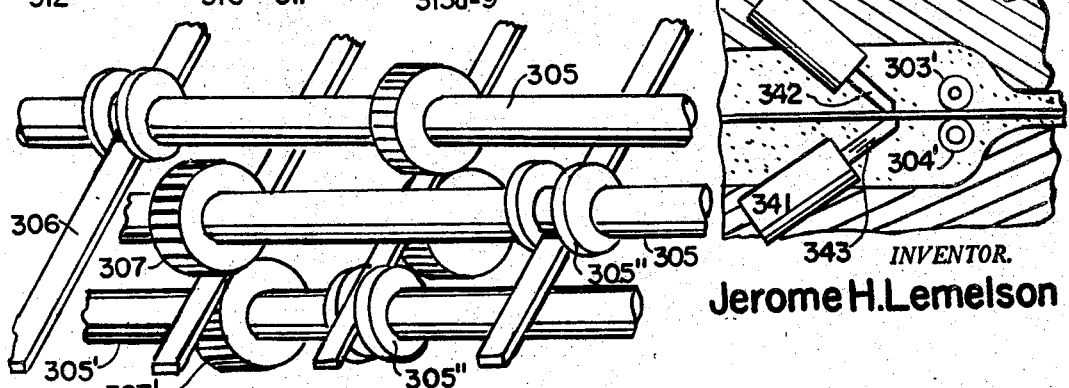
FIG. 30 is an isometric view of part of the apparatus utilized in FIGS. 28 and 29 with parts broken away for clarity.

FIG. 30 shows details of the conductor strip drive means. In addition to mounting a drive wheel 305 each shaft also mounts one or more guides 305" for adjacent conductor strips which provide lateral guidance for said strips which are adjacent to the strip being driven by the drive wheel of the shaft. The guides 305" may comprise pairs of metal washers welded or otherwise secured to the shaft and which are spaced apart a little more than the width of the conductors 353 and are positioned to receive said conductors and guide them between the inside walls of said washers. Thus the free or leading end of each strip when it is again driven towards the extrusion die after being previously stopped while a section was severed therefrom, is guided in parallel direction toward the extrusion throat which it enters substantially centered in the extruding sheet of plastic. For an apparatus employing a plurality of tiers or layers of such conductors in a single extruded sheet, banks or tiers of drive wheel pairs and guide means may be employed within or outside the extrusion chamber. For such a multiple conductor layer extrusion, the extrusion die may have a plurality of sheet-like die openings spaced sufficiently far apart to accommodate stop extrusion tools, slitting means and the like with each extrusion being automatically conveyed together in a laminating means for lamination with the others immediately after being extruded.

Shapes other than sheet forms may be extruded with electrical conductors embedded therein as described. For example, rigid thermoplastic or thermosetting dielectric material may be extruded into rigid structural shapes such as angles, channels, tubes, panels, corrugated sheets, rods and the like having one or more electrical conductors or hollow preformed tubes embedded therein. Wall panels may be extruded having one or more conductors embedded along predetermined lengths of the panel by the fabrication means described. Bus ducts may also be so extruded to shape with strip or wire conductors encapsulated as described in the walls thereof, along the entire or predetermined lengths of the ducts.

Another means for driving and selectively controlling the movement or each conductor 306 is illustrated in FIG. 31 which comprises a pair of cooperating lineal servos 340 and 342 secured within the extrusion chamber 302, which have shafts 341 and 343 which intermittently and simultaneously engage and disengage respective surfaces of the strip 306 in a manner such that the strip is advanced intermittently in the direction of the applied forces. The lineal servos 340 and 342 may comprise small air or hydraulic cylinders which are driven by a bidirectional, pulsating supply of fluid to rapidly advance and retract their shafts the short distance necessary to simultaneously engage opposite surfaces of the strip 306 and move it a short distance towards the die and retract a sufficient distance to clear the strip. The servos may also comprise push-pull electrical solenoids operated by an alternating current derived from a 60 cycle source gated thereto by a signal reproduced from the programming means of FIGS. 5 to 6 or by alternating current or pulse trains of the desired duration reproduced from the above described closed loop tape. The servos are obliquely positioned relative to the strip 306 and the ends of the shafts 341 are so shaped, that the net effect is to intermittently drive the strip in the direction the shafts 341 and 343 are advanced. A plurality of guide means 303' and 304' such as pins or free wheeling rollers extending completely across the extrusion chamber, may also be provided to guide the driven strip into the die opening. It is noted that the servos 340 and 342 may also comprise magnetostrictive oscillating and transducing means for magnetostrictively vibrating shafts 341 and 343 which are correctly positioned and operative to drive the strip in the described direction. The shaft ends are preferably roughened, abraded or serrated to effect a gripping action on opposite surfaces of the strip, or driving may be effected by providing said shaft ends with a point or thin edge extending laterally across the strip which when compressed and magnetostrictively moved against the surfaces of the strip, effect its unidirectional motion.

FIG. 32 illustrates an extrusion arrangement for providing an electrical harness such as 350 in which severance of each of the individual conducting strips or wires is effected prior to passage of the severed section through the extrusion die. Mounted within the extrusion chamber are a plurality of cutting blades 328 in either staggered or side-by-side array, each of which is adapted to be selectively advanced when energized by a programming means as described against a respective of the elongated conducting strips or wires 306 and to effect a severance thereof in a predetermined point in a production cycle at which point the means for driving the supply from which severed strip was cut stops. The severed strip is thereafter drawn through the extrusion die by powered rollers 334 and 335 engaging the width of the extrusion 350 and after the end of the severed section has passed through the die, the stop-extrusion tool 332 is advanced by its servo 331 to prevent extrusion of the band of material 351 associated with said strip. Slitting means of the type illustrated in FIGS. 31 and 32 may also be provided beyond the extruder although not shown. Notation 329 refers to a shear block or bucking bar for cooperating with knives 328 in shear-cutting selected conducting strips and 330 to a pair of guide plates positioned across the extrusion chamber for receiving and guiding the ends of the conductors 306 in reentering the extrusion die. Selective control of the movement of each conductor strip may be effected by automatic control as described of respective pairs of powered rollers 325, 326 which are part of a bank or banks of said rollers and which function as described. The roller drive means 325 and 326 may be supplemented or replaced by cooperating pairs of solenoids or lineal servos, such as 340 and 342 shown in FIG. 31, which may be mounted in the position of 325, 326 and/or at the extrusion throat. Positioning said lineal servos at the extrusion throat just prior to the point where the extrusion plastic begins to set or solidify will provide a means for precisely prepositioning each conductor within the extruded shape. A bank or banks of powered drive wheels 325', 326' are also provided downstream of the bank of shears 328 for guiding and powering the strips just severed and for receiving, and guiding the forward end of each strip-end passed thereto from the supply of said strips and for power driving the new strip lengths through the die opening.

FIG. 33 illustrates another apparatus for providing an electrical harness of the type described without the need for driving and guiding a plurality of strip conductors or wires through an extruder. All variable servos to be described are controlled to operate at predetermined points in a cycle to effect the production of a harness, by means of a predetermining controller 418 of the type described which may also be any type of multi-circuit, recycle timer.

A first sheet 403a of thermoplastic material is provided and travels at constant speed from a supply 402a thereof which may be a roll or may comprise an extruder for continuously supplying said sheet. Said sheet is guided and fed against a second sheet 403b of thermoplastic material by means of guide rolls 404a and 404b. A plurality of electrical conductors 401 in the form of parallel wires or strips of conducting sheet metal are fed from respective rolls or coils 400 through a plurality of pairs powered drive rolls 305 arranged in one or more banks as hereinabove provided and controlled as described to selectively start and stop to provide different lengths of conductors to be fed through the extruder.

The spacing and degree the drive and depressor wheels 305, 306 are staggered will depend on how close the plurality of conductors 401 are required when encapsulated or sealed between the two sheets 403a and 403b. Each drive wheel pair 305, 306 is operative to advance a respective conductor strip or wire 401 past a respective cutoff blade or shear 327, a plurality of separatively operable units of which are provided each of which are actuated by a pulse signal to advance and completely sever a respective conductor strip while the drive means therefore is stopped. One shear is for severing each of the conductors into predetermined lengths. The conducting strips are guided in predetermined paths in the direction where sheets 403a and 403b converge, by means of a plurality of outwardly flared guides 330 on the side of the shears 327 from which the strips are supplied. A plurality of similar guides 330' are provided on the other side of shears 327 for guiding attached or cut-off strips in predetermined paths between sheets 403a and 403b and for receiving and guiding the ends of each strip or wire fed thereto from its supply coil at the beginning of each cycle and guiding said strips parallel to each other between the laminating sheets 403a and 403b. Notations 416 and 417 refer to a pair of drive rolls which extend across all of the strips 401 for receiving, guiding and driving each strip as it passes between said rolls between the two flexible thermoplastic sheets 403a and 403b.

Thermoplastic sheets 403a and 403b are first brought together against the plural strips 401 by a first pair of heated drums 405a and 405b one or both of which are power rotated by motors not shown, which drums compress and render the two thermoplastic sheets semi-molten so that they are in a condition to be laminated together into an integral, unitary sheet with predetermined lengths of the conducting strips encapustated therein. A second pair of aligned drums 406a and 406b both of which are preferably power rotated by motors 406M and 406M' compressively engage the sheets and complete the laminating action. Depending on the plastic material employed for sheets 403a and 403b, and the temperature to which drums 405a and 405b have been heated, the latter drums 406a and 406b may be heated or cooled in order to complete the lamination process in which the two plastic sheets become welded together by heat and fusion. If the conducting strips 401 are substantially heavy in relation to the thickness of sheets 403a and 403b it will be necessary to heat both plastic sheets to a semi-molten condition throughout so that the unitary lamination of FIG. 34 may be obtained with parallel and flat major faces. If sheets 403a and 403b are thermosetting plastic or a thermoplastic material which is not heated to the semi-molten condition so that they may be reworked to derive the structure of FIG. 34 wherein flow of the plastic is effected over and around each conductor without surface deformations being formed, a lamination such as shown in FIG. 35 may be provided by one of a number of techniques including the employment of a suitable adhesive between the sheets for laminating purposes, or heating just the facing surfaces of the two sheets to render them in a condition whereby they may be fused or welded together when brought together and compressed by the drums. In a preferred form of the invention drums 405a and 405b are covered with silicone rubber and are heated as are areas adjacent the drums to heat both sheets before they come together. Drums 406a and 406b are cooled.

Downstream of the laminating drums are located a plurality of slitting cutters 320 arranged in one or more rows or staggered columns across the lamination and each positioned such that when its lineal servo or solenoid 321 is energized, the cutters will slit the material between conductor strips as illustrated at 352 in FIG. 29. Notation 319 refers to rollers or bucking plates which cooperate with respective cutting wheels in slitting the sheet. Certain of the slitting wheels are shown positioned under the laminated sheet 404 which may either cooperate with those above the sheet or slit different widths of the sheet and allow for closer longitudinal spacing of all cutters.

Situated further along from the cutters are a plurality of servo actuated cutting dies 420 each of which is adapted, when operative, to sever a particular width of the lamination 404 such as one of the widths 351 of FIG. 32 containing a single conductor. The punch presses or shears 420 replace the stop-extrusion tools of FIG. 32 and serve, when sequentially controlled in a cycle of operation by means of a programmer such as described, to provide the lateral strip areas 351 in the desired lengths. The cutting tools of shears 420 coact against a cutting table 323 or cutting bars situated beneath sheet 404 to effect said lateral strip area severing.

Situated also beneath sheet 404 are a plurality of drills, cutters or punches 322, which like shear cutters 420, are individually actuatable by respective servos 322M and are adapted, when their servo is activated by signals reproduced from the programming means 418, to effect cutouts in sheet 404 in alignment with respective conductors 401 for baring said conductors to permit electrical connection thereto. The programmer or controller 418 may be constructed as hereinabove described to generate analog or pulse signals in a predetermined sequence to control all of the variable servos described in order to obtain the desired sequential control to produce an electrical harness of predetermined shape. Each harness is completely severed from the lamination 404 by the action of cutters 420 which are preferably provided in one or more lateral arrays or banks. The severed and punched harness is driven out of the machine by one or more powered rollers represented by 409 and 410 the latter of which is shown as being powered by a speed controlled motor 411.

Notation 408 refers to a lineal counter which utilizes a wheel riding on the surface of 404 which energizes a relay therein when a particular length of the sheet 404 has passed the wheel. The output of the relay is a pulse which is passed on line 408' to reactivate programmer or multi-circuit timer 418 to start a new cycle to produce the next harness.

I claim:

1. An automatic production apparatus comprising in combination with a conveying means for guiding and moving an elongated structural member in a predetermined path, first servo means for driving said conveying means, a plurality of tools positioned adjacent said predetermined path for predeterminately operating on said structural member, a plurality of second servo means for respectively operating each of said tools and including powered means for independently advancing each of said tools to cause said tools to engage predetermined portions of the structural member when said portions are respectively aligned with said tools and for retracting each tool after it predeterminately operates on said member, controls for each of said servo means, and a variable program control means connected to operate said controls, said program control means including variable sequential signal generating means for generating a programmed sequence of signals during predetermined times in a production cycle for activating the controls of respective of said servo means to sequentially control the operation of said servo means to effect the sequential and predetermined operation of said tools on said predetermined portions of said workpiece.

2. Production apparatus comprising in combination, a conveying means for moving an elongated workpiece in a predetermined path, electrically controlled servo means for driving said conveying means, power operated tool means positioned adjacent said predetermined path for operating on said workpiece, respective servo means for operating said tool means including servo means for advancing said tool means to engage a predetermined area of the work piece when aligned therewith and for retracting the tool means after operating thereon, controls for said servo means, programming means connected to operate said controls including means for generating a plurality of command signals, means operative with the movement of said workpiece for generating feedback signals for indicating incremental movement of said workpiece, a comparator means, said programming means including means for generating a programmed sequence of signals during a predetermined time in a production cycle, said comparator means operative to receive said programmed signals and said feedback signals and to provide an output error signal for controlling the speed of said workpiece, said programming means including signal means for using said error signals and said programmed signals to control the operation of said servo means to effect the operation of said tool means on predetermined areas of said workpiece to effect predetermined changes in shape in the workpiece along predetermined lengths thereof.

3. An automatic control system, comprising in combination with a servo for positioning a tool or the like relative to a workpiece, said servo including an electrically operated stepping motor having a shaft which is operatively coupled for effecting said positioning, a plurality of inputs to said motor including a first input which, when energized, by electrical pulses applied thereto is operative in stepping the shaft of said stepping motor in a first direction a degree proportionate to the number of pulses applied thereto, a second input to said motor which when energized by pulses applied thereto is operative in stepping said shaft of said motor in the opposite direction a degree which is proportionate to the pulses applied thereto, a pulse generating means including a recording member, a plurality of recording channels of said recording member, means for guiding and driving said recording member, a plurality of transducers including a transducer adapted for scanning each of said channels, at least two of said channels having a plurality of recordings reproducible as pulse trains and positioned along different sections of each channel whereby when said channels are scanned by said transducers, pulse signals will be generated from but one of said two channels at a time, a first of said transducers adapted for scanning a first of said two channels and having its output operatively coupled to a first input to said stepping motor, a second transducer adapted for scanning the other of said two channels and having its output coupled to the other input of said stepping motor whereby movement of said recording member and signal reproduction therefrom is effective in predetermining the angular position of the shaft of said stepping motor and the relative position of said tool and workpiece.

4. Extrusion apparatus comprising an extruder having a die with an opening for expressing a thermoplastic material under pressure from a chamber of said extruder as an elongated shape, a stop-extrusion tool positioned adjacent said die opening, means for advancing and retracting said tool across said opening for varying the cross-section of the extruded shape by stopping off at least part of said opening, a heating means positioned adjacent said die opening and operative for transferring sufficient heat by conduction through said die to the material restrained from flowing when said tool is positioned across said die opening to retain said restrained material in a semi-molten condition such that when said tool is retracted and clears the opening in said die, the material across the die will be in substantially the same fluent state and will conform to the shape of the die, and means for automatically controlling said heating means to vary the amount of heat conducted through said die in accordance with variation in the cross-section of the shape being extruded and the position of said tool.

5. An extrusion apparatus comprising in combination with an extruder, a sheeting die for expressing a sheet-like formation from said extruder, a plurality of stop-extrusion means operatively connected to said die and each operative for reducing the opening in said die, separate servo means operatively connected to each of said stop-extrusion means and movable across said opening for reducing width of the die and blocking material flow to vary the width of the sheet-like extrusion, first means for extruding an insulating material through said die, means for feeding a plurality of elongated electrical conductors through said extrusion die apparatus defined by a respective stop-extrusion means, separate servo means for driving each of said elongated electrical conductors, separate cutting means for each of said conductors operative to sever predetermined lengths of conductors, respective servo means for operating each of said cutting means, a programming means having a plurality of outputs operatively connected to each of said servo means and including means for generating a programmed sequence for sequentially controlling said servo means to open and close respective widths of said die and to sever predetermined lengths of each of said conductors whereby an electrical harness may be produced having different lengths of electrical conductors integrally formed and held together in a common extrusion.

6. An apparatus in accordance with claim 5 including a plurality of cutting means supported beyond said extrusion die in positions to advance against the material being extruded and create a slit or separation of areas of the extrusion between each of the said conductors, each of said cutting means being operative by a respective servo means which is operatively connected to said programming means.

7. Apparatus in accordance with claim 5 including a plurality of hole cutting means secured beyond said die in positions to cut respective holes through portions of the extrusion defined by respective conductors whereby the adjacent conductor is exposed to the volume exterior thereof, a respective servo means operatively connected to each of said hole cutting means, controls for each of said servo means being operatively connected to said programming means whereby respective portions of each of said conductors may be exposed for electrically connecting other electrical elements thereto.

8. Extrusion apparatus comprising in combination with an extruder having a die and means for expressing an extrusion material from said die, means for feeding an elongated member through the opening in said extrusion die while expressing extrusion material therethrough to form a covering of said extrusion material on the surface of said elongated member, means operative during extrusion for reducing the cross-section of the portion of said die through which said extrusion material flows in a manner to cause the material extruded onto said elongated member to be reduced in cross-section along a predetermined length of said elongated member and to be correspondingly varied in its external shape.

9. Apparatus in accordance with claim 8 in which said elongated member is made of metal and is of substantially constant cross-section and said stop-extrusion means is operative in one mode to provide a substantially uniform jacket of extrusion material on the exterior surface of said conductor and in a second mode to substantially bare a portion of the length of said electrical conductor of said extrusion material.

10. Extrusion apparatus comprising in combination with an extruder including means for expressing an extrusion material under pressure, an extrusion die operatively connected to said extruder and having an opening of irregular shape for normally defining the shape of a ribbed extrusion, said die opening having a first portion for shaping a base portion of the extrusion, a plurality of branch portions extending outwardly from said first portion of said opening through which branch portions parallel rib-like formations may be expressed on said base portion of said opening through which branch portions supported adjacent the face of said die and including a plurality of spaced-separated blades, a support connected to said blades, means for guiding and moving said support to simultaneously move said plurality of blades in a manner whereby said blades block and unblock respective of said branch portions of said die opening whereby the height of said rib-like formations may be varied during an extrusion cycle and said rib-like formations may be completely eliminated from said base portion along a predetermined length of said extrusion.

11. Production apparatus comprising in combination with die means for shaping material into an elongated member, first power means for forcing said material through said die means, means for maintaining the speed of said elongated member substantially constant, first guide means positioned beyond said die means for guiding said member in a predetermined path therefrom, and a tool for operating on a first portion said elongated member beyond said die means, second power means for operating said tool, second guide means for guiding said tool in a path parallel to said elongated member, third power means for driving said tool along said guide means, reversible control means for said power means to control movement of the tool in the direction of travel of said elongated member and in the opposite direction, variable controls for said third power means adjustable to move said tool along said guide means at substantially the velocity of said member, and cycle control means operative to control operation of said tool and the means driving said tool to cause the tool to move parallel to said member and perform a predetermined operation relative to a predetermined first length thereof from a first position along said guide means and to reverse direction upon the completion of said operation and return to said first position, said cycle control means being operative to thereafter control the movement and operation of said tool relative to a second predetermined portion of said member to perform an operation thereon substantially similar to the operation performed on said first portion of said shaped material.

12. Production apparatus comprising in combination with die means for shaping a material into an elongated member, first power means for forcing said material through said die means, variable means for controlling the flow of said material through said die means to predetermine the speed of said elongated member away from said die means, first guide means for guiding said shape in a predetermined path beyond said die means, and a power operative tool adapted to operate on and change the shape of said elongated member downstream beyond said die means, second power means for operating said tool, second guide means for guiding said tool in a plurality of directions including movement parallel to the elongated member in the direction of its travel and in the opposite direction, second power means for driving said tool in said two directions, variable speed controls for said second power means, directional control means for changing the direction of travel of said tool along said tool guide means, and master control means for controlling said flow control means and said speed controls for said tool power means to effect predetermined changes in the shape of spaced apart predetermined portions of the elongated member as it moves along said guide means.

13. Production apparatus comprising in combination with die means for shaping a material into an elongated member, first power means for forcing said material through said die means, variable means for controlling the flow of said material through said die means to predetermine the speed of said elongated member away from said die means, first guide means for guiding said shape in a predetermined path beyond said die means, and a power operative tool adapted to operate on and change the shape of said elongated member downstream beyond said die means, second power means for operating said tool, means for guiding said tool in a plurality of directions including movement parallel to the elongated member in the direction of its travel and in the opposite direction, third power operative means for driving said tool in said two directions, variable speed controls for said power means, means for changing the direction of travel of said tool along said tool guide means, and cycle control means operative to control said second and third power means to cause said tool to move from a first position to operate on a first portion of said member while travelling therewith and to control operation of said tool to cause said tool to predeterminately change the shape of said first portion of said elongated member, said cycle control means being also operative to control said tool direction changing means to cause return of said tool to said first position and whereby the same operation may be effected on a second portion of said material as it travels from said die means.

14. Production apparatus including an extruder operative for expressing a material under pressure from a die to define an extrusion of predetermined shape, a power operated device including a tool located beyond the end of said die means for projecting said tool from a retracted position adjacent said extrusion to a position whereby said tool engages said extrusion power means for causing said tool to perform an operation on said extrusion, said tool including cutting means operative to cut said extrusion when engaged therewith, means for supporting said extrusion to prevent its deflection when engaged by said tool and automatic control means operative to control said power operated device to advance and cause said tool to engage predetermined portions of said extrusion to cut and effect predetermined changes in the shape of said extrusion along predetermined portions of the length of said extrusion.

15. Extrusion apparatus comprising an extruder having a die with an opening for expressing material as a continuous extrusion of predetermined shape, prime moving means operative for extruding said material from said die control means for starting and stopping said prime moving means, a power operative device positioned beyond said die for operating on said extrusion after it has left said die, control means for controlling said power operative device to operate on said extrusion and effect a predetermined change in its shape and means for controlling said extrusion prime moving means to stop movement of said extrusion prior to controlling the operation of said power operative device.

16. Extrusion apparatus comprising an extrusion machine having a die with an opening in which material is formed to a predetermined first shape, a mandrel projecting through the opening in said die, a length of said mandrel extending outward from the face of said die, means expressing a material through said die and over said mandrel into a tubular shape, a stop-extrusion tool supported by said extrusion apparatus and including a blade engaged with said die, said blade being projectable from a retracted position across the opening in said die to a position operative to partially block the flow of material through said opening, means operative for projecting said blade across said opening to engage said mandrel, means for retracting said blade from said mandrel, means controlling said servo means to advance said blade at predetermined times in an extrusion cycle whereby to cause a reduction in the cross section of said extrusion and to provide a slot in the wall of said tubular extrusion of predetermined length and along a predetermined section of said tubing, said mandrel to receive and longitudinally support said blade when said blade is engaged therewith.

17. Extrusion apparatus in accordance with claim 16, the blade of said stop extrusion tool being tapered to permit it to penetrate the material extruding from said die and to exert a shearing action thereon, said blade being operative to predeterminedly change the cross section of said extrusion when predeterminedly positioned across said die opening, and means for supporting said extruding member against deformation when said blade is urged thereagainst, said blade being supported by the outside face of said die and operative to slidably engage said die in movement across the opening thereof, means for effecting sealing engagement between said blade and said die to prevent flow of said material between said blade and the face of said die, and support means mounted on said die to prevent deflection of said blade.

18. Extrusion apparatus in accordance with claim 17, said stop extrusion tool means comprising a plurality of blades supported against the outer face of said die and each operative to be moved from a retracted position clearing a passageway branching from said main passageway to a position completely obstructing the branch passageway, separate reversible power means for driving each of said tools, control means for each of said power means, and cycle control means operatively connected to said control means for controlling operation of said tools to predeterminedly advance and retract from the branch openings in the die passageway during an extrusion cycle for providing rib-like formations along predetermined portions of the extrusion.

19. Extrusion apparatus comprising in combination with an extruder having a die and including means for expressing extrusion material to a first shape defined by the shape of the opening in said die, a stop extrusion tool supported at the end of said extruder and including a blade operative to be projected across the opening in said die to change the shape of the cross sectional area of said die, cam means operative to compressively engage said blade against the face of said die, servo means for actuating said blade and said cam means, and means for variably controlling operation of said servo means, operation of said blade to advance a predetermined degree across the opening in said die and said cam means to cooperate in engaging said blade against said die and to reverse operation of said cam means and retract said blade according to a predetermined program to produce an extrusion whose shape varies along its length in a predetermined manner.

References Cited

UNITED STATES PATENTS

| | | | |
|---|---|---|---|
| 3,044,153 | 7/1962 | Kent et al. | 207—10 |
| 3,041,718 | 7/1962 | Stuchbery | 207—10 |
| 3,015,154 | 1/1962 | Evans | 29—183 |
| 3,058,205 | 10/1962 | Sparck | 29—183 |
| 2,444,186 | 6/1948 | Elliot et al. | 318—443 |
| 2,442,835 | 6/1948 | Allen | 318—443 |
| 3,025,959 | 3/1962 | Poleschuck | 207—2 |
| 2,974,790 | 3/1961 | Murphy | 207—2 |
| 2,902,147 | 9/1959 | Meier | 207—3 |

(Other references on following page)

UNITED STATES PATENTS

| | | | |
|---|---|---|---|
| 2,828,859 | 4/1958 | Emmerich | 207—10 |
| 2,445,677 | 7/1948 | Leguillon | 156—500 |
| 697,551 | 4/1902 | Scott | 156—500 |
| 2,936,518 | 5/1960 | Schneider | 29—400 |
| 2,896,315 | 7/1959 | Dubberke | 29—400 |
| 2,806,596 | 9/1957 | Dodds | 207—10 |
| 2,385,574 | 9/1945 | Hyprath | 207—16 |
| 2,628,417 | 2/1953 | Peyches | 29—423 |
| 2,851,770 | 9/1958 | Fromson | 29—423 |
| 3,002,614 | 10/1961 | Jones | 207—2 |
| 2,934,206 | 4/1960 | Scribner | 207—2 |
| 2,730,759 | 1/1956 | Lorenian | 18—12 |
| 2,720,310 | 10/1955 | Yack | 207—10 |
| 2,679,932 | 6/1954 | Burns | 207—10 |
| 1,800,848 | 4/1931 | Sheldon | 22—190 |
| 2,485,065 | 10/1949 | Papazian | 22—190 |
| 2,063,955 | 12/1936 | Schlitz | 29—33.12 |
| 2,212,402 | 8/1940 | Pieser | 29—33.12 |
| 2,131,173 | 9/1938 | Gretenail | 207—10.4 |

FOREIGN PATENTS 544,114   3/1942   Great Britain.

CHARLES W. LANHAM, *Primary Examiner.*

K. C. DECKER, *Assistant Examiner.*

U.S. Cl. X.R.

72—60, 254, 258, 260, 265, 468